(12) United States Patent
Stephanson et al.

(10) Patent No.: US 11,269,107 B2
(45) Date of Patent: Mar. 8, 2022

(54) SENSOR ASSESSMENT NETWORK USING MAGNETIC FIELD SENSORS

(71) Applicant: MIS SECURITY, LLC, Tallahassee, FL (US)

(72) Inventors: Cory J. Stephanson, La Selva Beach, CA (US); Scott A. Sterling, Santa Cruz, CA (US)

(73) Assignee: MIS SECURITY, LLC, Tallahassee, FL (US)

(*) Notice: Subject to any disclaimer, the term of this patent is extended or adjusted under 35 U.S.C. 154(b) by 237 days.

(21) Appl. No.: 16/722,018

(22) Filed: Dec. 20, 2019

(65) Prior Publication Data

US 2021/0190988 A1   Jun. 24, 2021

(51) Int. Cl.
   *G01V 3/08*   (2006.01)

(52) U.S. Cl.
   CPC .............. *G01V 3/087* (2013.01); *G01V 3/081* (2013.01)

(58) Field of Classification Search
   CPC .... G01V 3/087; G01V 3/081; G01R 33/0035; G01R 33/028; H01F 17/04; H01F 27/2823
   USPC ............................. 324/202, 207.22; 702/150
   See application file for complete search history.

(56) References Cited

U.S. PATENT DOCUMENTS

| | | | | |
|---|---|---|---|---|
| 4,825,166 A | * | 4/1989 | MacGugan | G01R 33/045 29/606 |
| 5,689,182 A | * | 11/1997 | Togo | G01D 11/245 29/602.1 |
| 6,595,933 B2 | * | 7/2003 | Sarvazyan | A61B 5/061 600/587 |
| 6,993,443 B2 | * | 1/2006 | Harle | G01B 7/004 324/207.11 |
| 7,319,321 B2 | * | 1/2008 | Murray | G01V 3/081 324/243 |

(Continued)

FOREIGN PATENT DOCUMENTS

| | | | | |
|---|---|---|---|---|
| CN | 109975879 A | * | 7/2019 | |
| CN | 110967774 A | * | 4/2020 | |

(Continued)

OTHER PUBLICATIONS

Written Opinion of the International Searching Authority of PCT/US20/57302—dated Jun. 2021. (Year: 2021).*

(Continued)

*Primary Examiner* — Patrick Assouad
*Assistant Examiner* — Sean Curtis
(74) *Attorney, Agent, or Firm* — Allen, Dyer, Doppelt + Gilchrist, P.A.

(57) ABSTRACT

A security portal includes magnetic field sensors in a sensor assessment network (SAN) for tracking a magnetic dipole target. Each sensor includes a sensor transducer, a sensor coil, and a digitally controlled potentiometer. A sensor controller applies a stepped voltage, samples an output frequency at each stepped voltage value, generates a magnetic sensor response curve, and converts a non-linear response of the sensor transducer to a magnetic field value for each x, y and z channel as a function of frequency for a specific potentiometer setting based upon the sensed magnetic dipole that is tracked in the security portal. A SAN controller receives the magnetic field values from each channel and determines the magnetic field vectors of the target over each sample.

26 Claims, 18 Drawing Sheets

(56) References Cited

U.S. PATENT DOCUMENTS

| | | | | |
|---|---|---|---|---|
| 7,573,257 | B2* | 8/2009 | Li | G01V 3/081 324/202 |
| 7,898,248 | B2* | 3/2011 | Douglas, Jr. | G01V 3/081 324/244 |
| 8,120,354 | B2* | 2/2012 | Stephanson | G01R 33/10 324/228 |
| 8,560,259 | B2* | 10/2013 | Stephanson | G01R 33/0035 702/85 |
| 8,729,891 | B2* | 5/2014 | Stephanson | G01R 33/0035 324/228 |
| 8,768,639 | B2* | 7/2014 | Stephanson | G01R 35/00 702/85 |
| 8,902,936 | B2* | 12/2014 | Stephanson | H04J 3/02 370/537 |
| 9,225,783 | B2* | 12/2015 | Stephanson | G01D 21/00 |
| 9,354,291 | B2* | 5/2016 | Stephanson | G01R 33/0035 |
| 9,404,988 | B2* | 8/2016 | Stephanson | G01R 33/0035 |
| 9,448,288 | B2* | 9/2016 | Diaconu | G01R 33/075 |
| 9,619,999 | B2* | 4/2017 | Stephanson | G01D 21/02 |
| 9,638,766 | B2* | 5/2017 | Diaconu | G01R 33/0017 |
| 9,812,588 | B2* | 11/2017 | Vig | G01D 5/147 |
| 10,020,844 | B2* | 7/2018 | Bogdan | H04L 12/413 |
| 10,107,872 | B2* | 10/2018 | Stephanson | G01R 35/00 |
| 10,165,228 | B2* | 12/2018 | Stephanson | H04N 7/183 |
| 10,459,103 | B1* | 10/2019 | Shi | G01V 8/10 |
| 10,566,971 | B2* | 2/2020 | Selvaraj | H03K 17/9525 |
| 10,610,679 | B2* | 4/2020 | Riley | A61N 1/3925 |
| 10,976,381 | B2* | 4/2021 | Stephanson | H01F 27/2823 |
| 2001/0031934 | A1* | 10/2001 | Sarvazyan | A61B 5/4312 600/587 |
| 2003/0029345 | A1* | 2/2003 | Tiernan | F42C 15/40 102/221 |
| 2005/0182590 | A1* | 8/2005 | Kotter | G06K 9/00771 702/127 |
| 2006/0197523 | A1* | 9/2006 | Palecki | G01V 3/081 324/244 |
| 2007/0013372 | A1* | 1/2007 | Murray | G01V 3/081 324/244 |
| 2007/0296571 | A1* | 12/2007 | Kolen | G08B 21/0446 340/539.11 |
| 2008/0157761 | A1* | 7/2008 | Li | G01V 3/081 324/244 |
| 2009/0182524 | A1* | 7/2009 | Stephanson | G08B 13/19697 702/127 |
| 2009/0273340 | A1* | 11/2009 | Stephanson | G01R 33/02 324/202 |
| 2009/0327191 | A1* | 12/2009 | Douglas, Jr. | G01V 3/081 706/46 |
| 2011/0285389 | A1* | 11/2011 | Jewitt | G01V 3/081 324/244 |
| 2011/0285390 | A1* | 11/2011 | Jewitt | G01V 3/081 324/244 |
| 2011/0285392 | A1* | 11/2011 | Deng | G01V 3/081 324/248 |
| 2012/0136606 | A1* | 5/2012 | Stephanson | G01R 33/02 702/104 |
| 2012/0143548 | A1* | 6/2012 | Stephanson | G01R 33/028 702/85 |
| 2012/0161771 | A1 | 6/2012 | Apostolos et al. | |
| 2012/0206143 | A1* | 8/2012 | McGushion | G01R 33/022 324/318 |
| 2013/0162813 | A1* | 6/2013 | Stephanson | H04N 7/183 348/135 |
| 2013/0163619 | A1* | 6/2013 | Stephanson | G01D 21/02 370/537 |
| 2013/0166252 | A1* | 6/2013 | Stephanson | H04Q 9/00 702/190 |
| 2014/0032155 | A1* | 1/2014 | Stephanson | G01R 35/005 702/104 |
| 2014/0159711 | A1* | 6/2014 | Tsai | G01R 15/148 324/228 |
| 2014/0195190 | A1* | 7/2014 | Stephanson | G01R 33/028 702/104 |
| 2014/0285183 | A1* | 9/2014 | Stephanson | G01R 33/0035 324/202 |
| 2015/0003480 | A1* | 1/2015 | Stephanson | G01D 21/02 370/537 |
| 2015/0285611 | A1* | 10/2015 | Lowery | G01R 33/0005 702/150 |
| 2015/0338473 | A1* | 11/2015 | Diaconu | G01D 5/145 324/251 |
| 2016/0071406 | A1* | 3/2016 | Stephanson | H04L 67/12 370/537 |
| 2016/0146905 | A1* | 5/2016 | Diaconu | G01R 33/0017 324/251 |
| 2016/0161241 | A1* | 6/2016 | Li | G06F 3/012 324/207.21 |
| 2016/0279405 | A1* | 9/2016 | Riley | A61N 1/046 |
| 2017/0010335 | A1* | 1/2017 | Stephanson | G01R 35/00 |
| 2019/0056243 | A1* | 2/2019 | Foster | A61B 5/062 |
| 2019/0074832 | A1* | 3/2019 | Selvaraj | G06F 13/4072 |
| 2020/0261712 | A1* | 8/2020 | Riley | G16H 40/63 |
| 2020/0355754 | A1* | 11/2020 | Stephanson | H01F 5/02 |
| 2021/0190988 | A1* | 6/2021 | Stephanson | G01V 3/087 |
| 2021/0208213 | A1* | 7/2021 | Stephanson | G01R 33/0035 |
| 2021/0287546 | A1* | 9/2021 | Englander | B60Q 5/006 |

FOREIGN PATENT DOCUMENTS

| | | | | |
|---|---|---|---|---|
| KR | 10-2016-0067052 A | | 6/2016 | |
| KR | 102273446 B1 | * | 7/2021 | |
| WO | WO-2019036528 A1 | * | 2/2019 | A61B 5/062 |
| WO | WO-2020231686 A1 | * | 11/2020 | G01R 33/028 |
| WO | WO-2021126368 A1 | * | 6/2021 | G01V 3/081 |

OTHER PUBLICATIONS

U.S. Appl. No. 16/408,601, filed May 10, 2019 Inventors: Cory J. Stephanson; Scott A. Sterling.

* cited by examiner

| STATISTIC | R1_XnT | R1_YnT | R1_ZnT | R1_SOS | R2XnT | R2_YnT | R2_ZnT | R2_SOS |
|---|---|---|---|---|---|---|---|---|
| MEAN S-S VARIANCE | 2.7 | 4.2 | 6.7 | 122.0 | 4.1 | 3.7 | 10.3 | 240.5 |
| MEDIAN S-S VARIANCE | 3.0 | 3.6 | 4.0 | 70.9 | 4.0 | 3.0 | 10.0 | 125.0 |
| NUMBER OF SAMPLES | 300 | 300 | 300 | 300 | 300 | 300 | 300 | 300 |
| MOST POSITIVE | 8 | 14 | 24 | 788 | 16 | 14 | 51 | 2617 |
| MOST NEGATIVE | -9 | -14 | -28 | 0 | -14 | -24 | -36 | 0 |
| RANGE OF FULL COLLECTION | 17 | 28.3 | 52 | 788 | 30 | 38 | 87 | 2617 |
| LARGEST CHANGE (SAMPLE TO SAMPLE) | 9 | 14.2 | 28 | 788 | 16 | 24 | 51 | 2601 |
| FREQUENCY OF 10% CHANGE | 55 | 43 | 62 | 160 | 73 | 91 | 63 | 251 |
| FREQUENCY OF 20% CHANGE | 0 | 0 | 100 | 65 | 1 | 84 | 98 | 50 |
| FREQUENCY OF 30% CHANGE | 58 | 107 | 47 | 34 | 88 | 61 | 61 | 12 |
| FREQUENCY OF 40% CHANGE | 45 | 71 | 29 | 9 | 41 | 50 | 41 | 7 |
| FREQUENCY OF 50% CHANGE | 58 | 3 | 20 | 15 | 64 | 7 | 16 | 7 |
| FREQUENCY OF 60% CHANGE | 38 | 40 | 8 | 9 | 0 | 3 | 5 | 2 |
| FREQUENCY OF 70% CHANGE | 21 | 0 | 17 | 3 | 28 | 1 | 8 | 0 |
| FREQUENCY OF 80% CHANGE | 16 | 28 | 13 | 3 | 0 | 2 | 5 | 2 |
| FREQUENCY OF 90% CHANGE | 7 | 5 | 3 | 1 | 3 | 0 | 2 | 0 |
| FREQUENCY OF MAX CHANGE | 2 | 3 | 1 | 1 | 2 | 1 | 1 | 0 |
| PERCENTAGE OF 10% CHANGE | 18.33% | 14.33% | 20.67% | 53.33% | 24.33% | 30.33% | 21.00% | 83.67% |
| PERCENTAGE OF 20% CHANGE | 0.00% | 0.00% | 33.33% | 21.67% | 0.33% | 28.00% | 32.67% | 16.67% |
| PERCENTAGE OF 30% CHANGE | 19.33% | 35.67% | 15.67% | 11.33% | 29.33% | 20.33% | 20.33% | 4.00% |
| PERCENTAGE OF 40% CHANGE | 15.00% | 23.67% | 9.67% | 3.00% | 13.67% | 16.67% | 13.67% | 2.33% |
| PERCENTAGE OF 50% CHANGE | 19.33% | 1.00% | 6.67% | 5.00% | 21.33% | 2.33% | 5.33% | 2.33% |
| PERCENTAGE OF 60% CHANGE | 12.67% | 13.33% | 2.67% | 3.00% | 0.00% | 1.00% | 1.67% | 0.67% |
| PERCENTAGE OF 70% CHANGE | 7.00% | 0.00% | 5.67% | 1.00% | 9.33% | 0.33% | 2.67% | 0.00% |
| PERCENTAGE OF 80% CHANGE | 5.33% | 9.33% | 4.33% | 1.00% | 0.00% | 0.67% | 1.67% | 0.67% |
| PERCENTAGE OF 90% CHANGE | 2.33% | 1.67% | 1.00% | 0.33% | 1.00% | 0.00% | 0.67% | 0.00% |
| PERCENTAGE OF MAX CHANGE | 0.67% | 1.00% | 0.33% | 0.33% | 0.67% | 0.33% | 0.33% | 0.00% |
| STANDARD DEVIATION | 2.1 | 3.1 | 6.2 | 131.0 | 3.2 | 3.5 | 9.1 | 334.3 |
| 95% CONFIDENCE | 0.007 | 0.011 | 0.022 | 0.474 | 0.012 | 0.013 | 0.033 | 1.210 |

FIG. 20

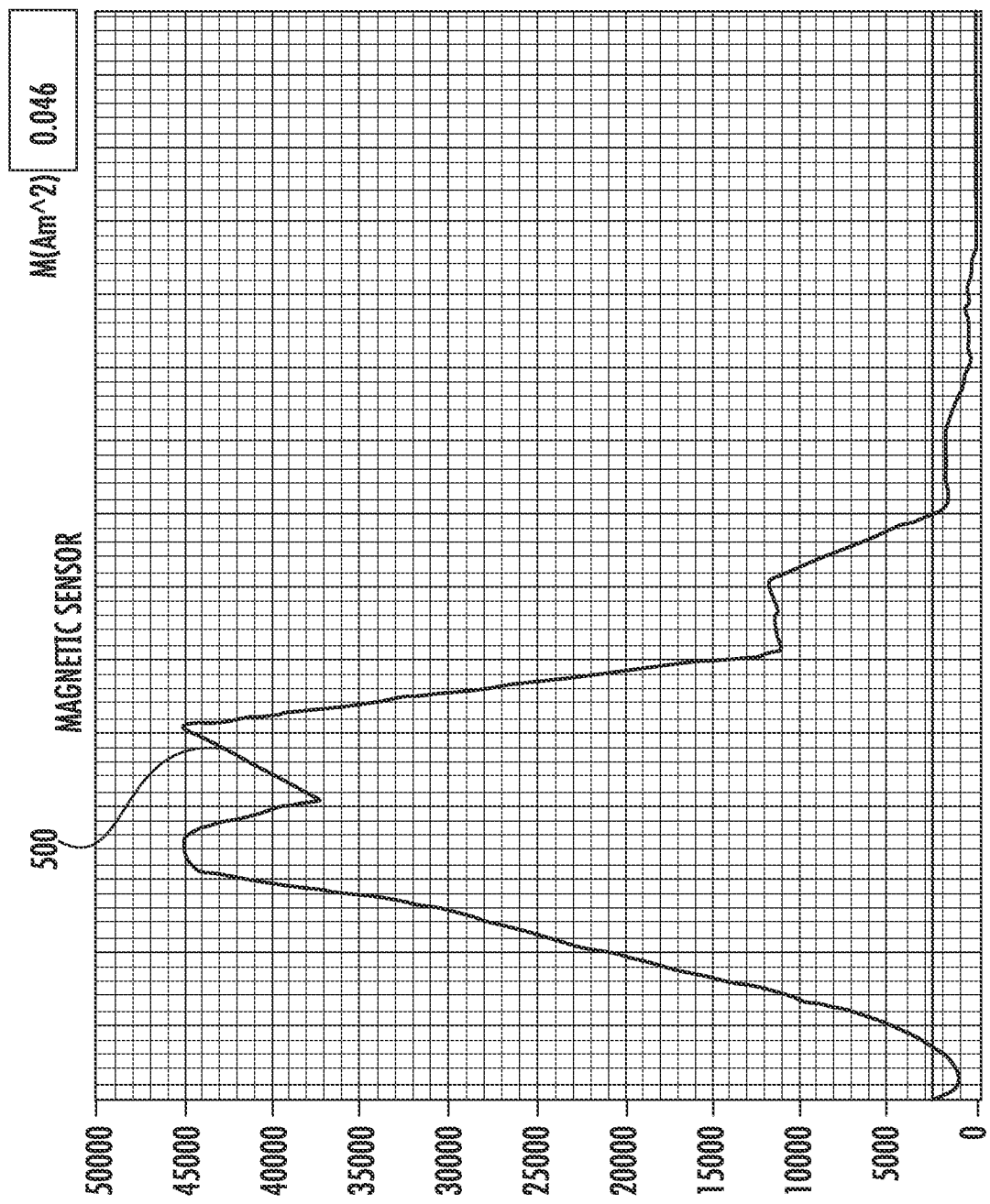

SENSOR ASSESSMENT NETWORK USING MAGNETIC FIELD SENSORS

FIELD OF THE INVENTION

The present invention relates to magnetic field sensors, and more particularly, this invention relates to security portals and sensor assessment networks.

BACKGROUND OF THE INVENTION

The output of magnetic field sensors vary, with their output based on a variety of factors, including temperature, tolerance variances in the electronic control circuitry, and the sensor transducer orientation relative to Earth's magnetic North. This may lead to processing challenges that present themselves for many magnetic field sensors, but in particular, for multi-axis magnetic field sensors because each of the three primary axes are oriented in different positions relative to magnetic North, for example, in an x, y and z axis direction. As a result, the output from magnetic field sensors may be non-linear, and this type of non-linear output may be difficult to quantify. In applications where quantification is desired, advanced, complicated and expensive electronic components and circuits are often required to process the signals and attempt to force the output of one or more of the magnetic field sensors to be calibrated to a reliable Tesla (magnetic measurement) value. Some existing solutions are limited to forcing a calibration over a very small bandwidth, and only under certain conditions. Additionally, in cases where the magnetic field sensor is employed at a location where there is an excessive magnetic field, such as near rebar or other ferrous materials, the magnetic field sensors typically will not operate in a calibrated mode, since there is a bias to the output due to the environment.

Copending and commonly assigned U.S. application Ser. No. 16/408,601 filed May 10, 2019 by the same inventors, the disclosure which is hereby incorporated by reference in its entirety, discloses a magnetic field monitor as a sensor that monitors magnetic field fluctuations occurring in an environment. This magnetic field sensor is configured to generate an electronic signal at a time period representing a magnetic field of the environment. It includes a sensor transducer, a controller, and a digitally controlled potentiometer. A self-calibrating module may be connected to the magnetic field sensor and configured to generate a relative baseline signal based on an average value of electronic signals generated at previous time periods to represent the magnetic field of the environment. A comparator may be connected to the calibrator and configured to determine a difference between the relative baseline signal and electronic signal and generate a calibrated output signal if the difference is greater than or equal to a threshold. When a calibrated output signal is not generated, the controller and digitally controlled potentiometer may be configured to operate the sensor transducer to obtain a quantitative linear output.

This magnetic field monitor as a sensor provides for target detection and reliably and repeatedly allows the conversion of qualitative, uncalibrated, non-linear magnetic sensor output into quantitative, Tesla calibrated linear output over a wide bandwidth range. The sensor may provide a rapid technique for detection and calibration and accounts for differences in outputs based on sensor orientation. Further enhancements are desired, however, for not only target assessment, but also localizing, tracking, and/or identifying a target.

SUMMARY OF THE INVENTION

This summary is provided to introduce a selection of concepts that are further described below in the Detailed Description. This summary is not intended to identify key or essential features of the claimed subject matter, nor is it intended to be used as an aid in limiting the scope of the claimed subject matter.

Generally, a security portal includes an environment to be monitored and through which individuals entering or exiting the security portal pass, and includes a plurality of magnetic field sensors spaced from each other within the environment to be monitored and defining a sensor assessment network (SAN) for tracking a target having a magnetic dipole within the environment to be monitored. Each magnetic field sensor has x, y and z axes and produces x, y and z channels at respective axes, and each may include a sensor transducer having a sensor coil, and a digitally controlled potentiometer connected to the sensor coil. A sensor controller may be connected to the sensor coil and digitally controlled potentiometer and configured to apply a stepped voltage from negative to positive over the sensor coil, sample an output frequency at each stepped voltage value, generate a magnetic sensor response curve, and convert a non-linear response of the sensor transducer to a magnetic field value for each channel as a function of frequency for a specific potentiometer setting based upon a sensed magnetic dipole as a target that is tracked in the security portal. A SAN controller is connected to each magnetic field sensor and configured to receive the magnetic field values of each channel in each magnetic field sensor and determine the magnetic field vectors of the target over each sample.

The SAN controller may be integrated into one of the plurality of magnetic field sensors. Each sensor controller may be configured to sample at about 100 ms intervals in timed relation to other respective sensor controllers. The sensor controller may be configured to set the gain of the digitally controlled potentiometer at a maximum value for each x, y and z channel independently. The SAN controller may also be configured to determine the magnetic field vectors of the target at known locations. The SAN controller may be configured to determine the trajectory of the target based upon signal attenuation of the magnetic dipole and a dot-product of matrices of partial derivatives.

In another example, a camera may be connected to the SAN controller and positioned to image the security portal. The SAN controller may be configured to generate an overlay of the target position to an image of the security portal produced by the camera. The sensor coil may include a primary coil and secondary, over-winding coil. Four magnetic field sensors may be positioned in a rectilinear configuration. The magnetic field sensors may be positioned on a portal structure.

In yet another aspect a method of operating a sensor assessment network (SAN) may comprise providing a plurality of magnetic field sensors, each magnetic field sensor having x, y and z axes and producing x, y and z channels at respective axes and each comprising, a sensor transducer having a sensor coil, a digitally controlled potentiometer connected to the sensor coil, and a sensor controller connected to the sensor coil and digitally controlled potentiometer. The method includes applying a stepped voltage from negative to positive over the sensor coil and sampling an output frequency at each stepped voltage value.

The method may further include generating a magnetic sensor response curve and converting a non-linear response of the sensor transducer to a magnetic field value for each channel as a function of frequency for a specific potentiometer setting based upon a sensed magnetic dipole, receiving the magnetic field values within a SAN controller connected to each magnetic field sensor, and determining the magnetic field vectors of the target over each sample based upon the magnetic field value.

DESCRIPTION OF THE DRAWINGS

Other objects, features and advantages of the present invention will become apparent from the Detailed Description of the invention which follows, when considered in light of the accompanying drawings in which:

FIG. 20 is a chart showing results for the parametric data used with the sensor assessment network in accordance with a non-limiting example.

FIG. 21 is a graph showing a center of event for position and trajectory in accordance with a non-limiting example.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The sensor assessment network (SAN) as described herein may be integrated into a security portal, which includes an environment to be monitored and through which individuals pass to enter or exit the security portal. The SAN provides more than target detection, but also target assessment and employs sensor data from a plurality of magnetic field sensors to determine physical features of the target that can used to localize, track, and/or identify the target, including assessments based on spatial location in one, two, or three dimensions, velocity components, and forward predictions of the location at a future time as to trajectory. These assessments could include properties of the object that may aid in identifying the object, including the net magnetic and/or electric dipole moments.

For purposes of description, details of the magnetic field monitor as described in the above-identified and incorporated by reference '601 application are explained followed by further details of the security portal that includes the SAN for tracking a magnetic dipole target within the environment to be monitored as part of the security portal, and including a SAN controller connected to each magnetic field sensor and configured to receive the magnetic field values of each channel and each magnetic field sensor and determine the magnetic field vectors of the target over each sample. The magnetic field monitor as described in the copending '601 application may be incorporated within a self-calibrating module as described below and modified for the SAN.

Reference is made to commonly assigned U.S. Pat. No. 10,165,228, the disclosure which is hereby incorporated by reference in its entirety. When a calibrated output signal is not generated using the system as described in the '228 patent, the magnetic field monitor as described in the incorporated by reference '601 application may be configured to operate the sensor transducer to obtain a quantitative linear output and provide a quantitative relationship between change in frequency versus change in Tesla magnetic units.

Figure 1:
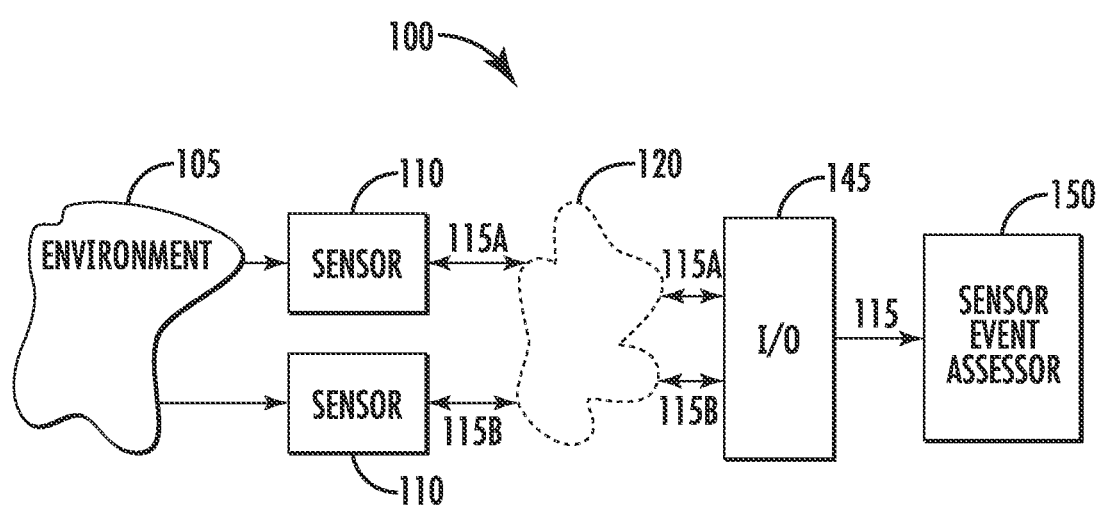
FIG. 1 is a block diagram of a magnetic field sensing system.
Figure 2:
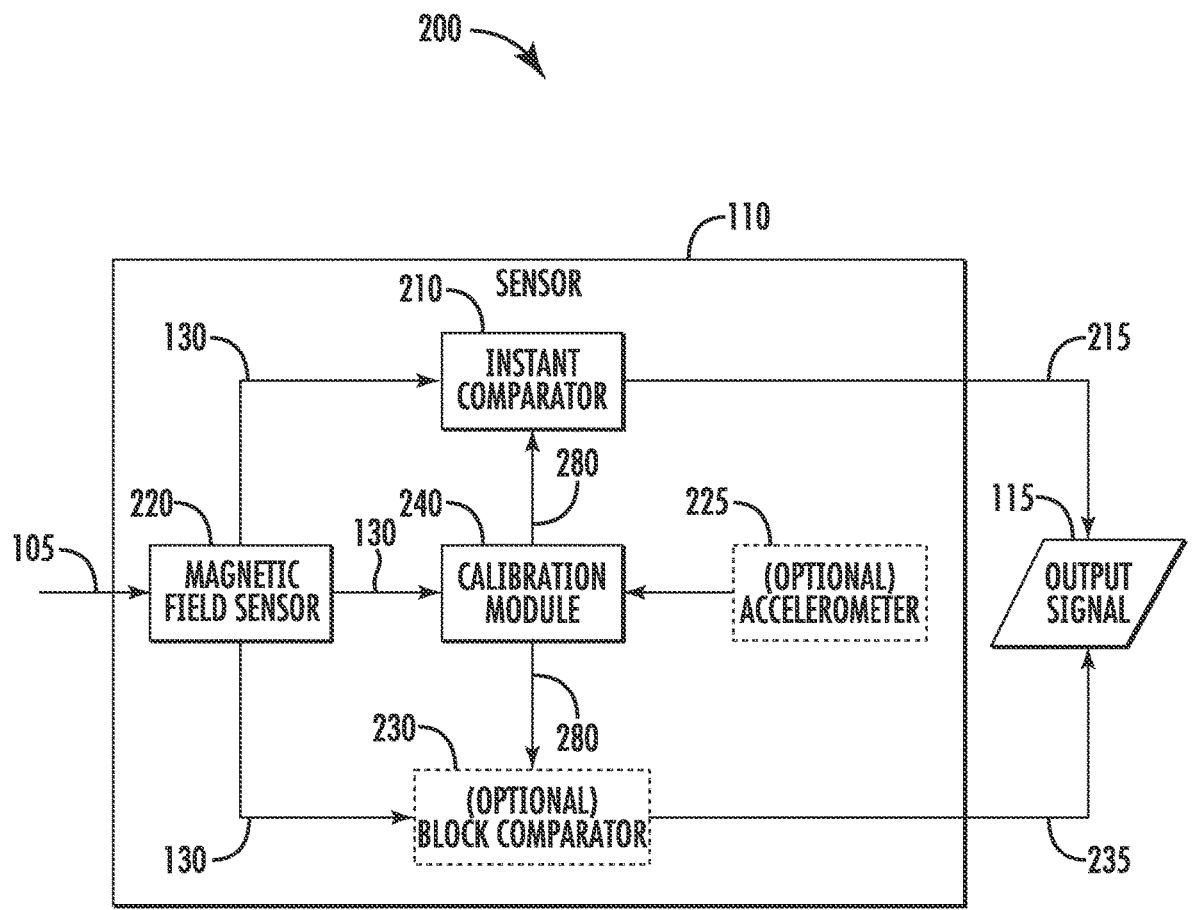
FIG. 2 is a block diagram of a magnetic field sensor used in the magnetic field sensing system of FIG. 1.
Figure 3:
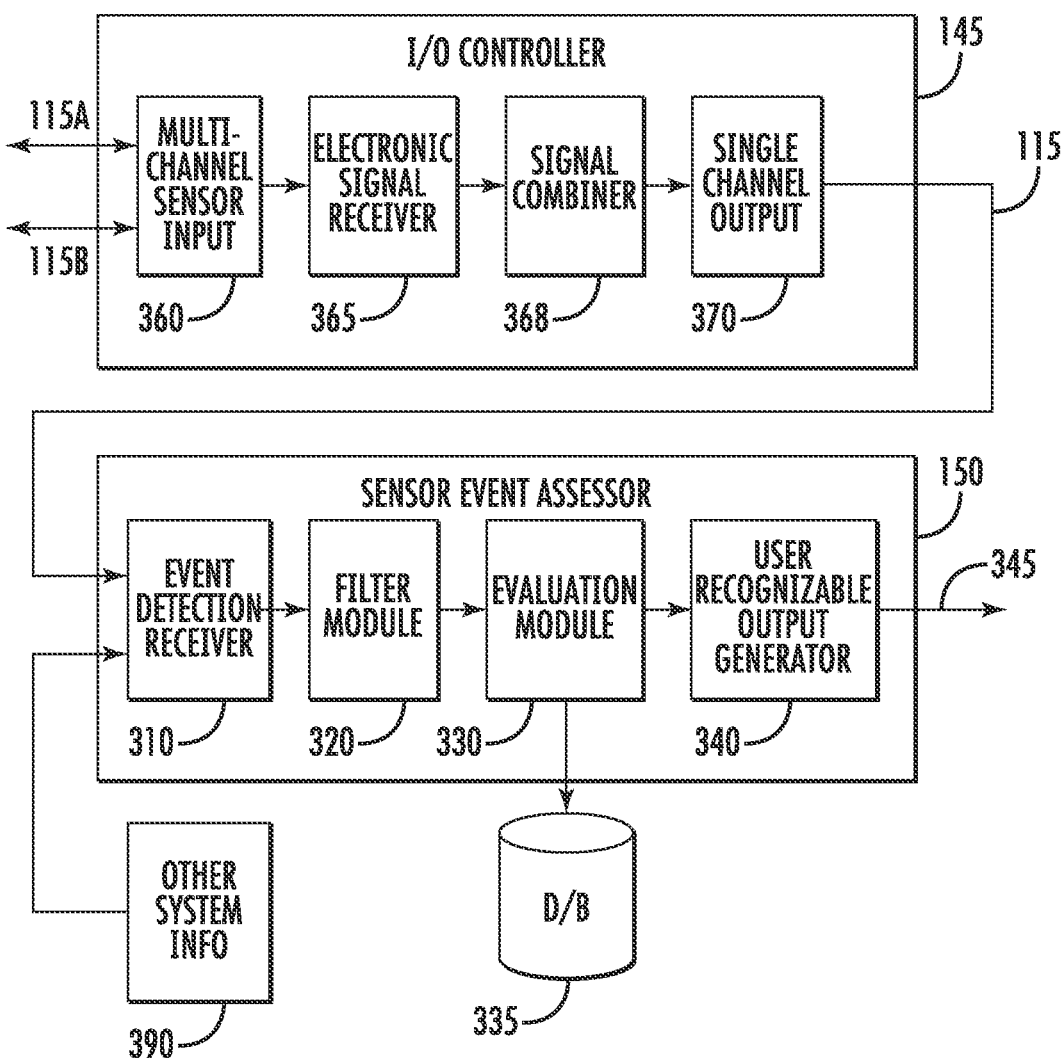
FIG. 3 is a block diagram of the input/output controller and sensor event assessor shown in FIG. 1.

For purposes of explanation, a short description of the sensor event assessor training and integration as described in '228 patent is set forth relative to FIGS. 1-3 and further reference should be made to the description in the '228 patent to understand fully the workings and operation of that system. The magnetic field monitor may be used with that dynamically self-adjusting system as described in the '228 patent and also in commonly assigned U.S. Pat. Nos. 9,354, 291 and 10,107,872, the disclosures which are hereby incorporated by reference in their entirety.

With reference to FIG. 1, a block diagram 100 of a sensor event assessor system as described in the incorporated by reference '228 patent is shown. As illustrated, an environment 105 is illustrated and at least two magnetic field sensors 110 which provide output signals 115A and 115B over a connection 120. Output signals 115A, 115B are received by input/output (I/O) controller 145, which receives the multi-channel output signals 115A and 115B and combines them into a single channel 115 that is passed to sensor event assessor 150. Although two output signals 115A and 115B are shown, the technology is not limited to only two sensors, but a large plurality of sensors may be used. In this example and relative to the description, the sensors 110 are magnetic field sensors.

In general, the environment 105 may be natural or built and is usually described using a combination of atmosphere, climate and weather conditions. Example environments may include, but are not limited to, desert, tundra, canopy, jungle, rivers, aquatic, littoral, savannah, marine, urban or the like. In one example, the environment 105 is a localized area or portion of an environment, similar to an ecosystem. For example, in one embodiment the area represented by environment 105 may approximate the range of operation of magnetic field sensors 110. The environment 105 may be an outdoor area. However, in another embodiment, the environment 105 may be an indoor area such as a room, a structure or the like. In yet another embodiment, the environment 105 may be a combination of indoor and outdoor areas such as an outpost, or the like. Additionally, part or all of environment 105 may be dry, partially or completely submerged, partially or completely buried, and the like. Further details are described in the incorporated by reference '228 patent.

With reference now to FIG. 2, a block diagram 200 of one of the at least two magnetic field sensors 110 as a magnetic field monitor, in this example, is shown in accordance with one embodiment. The magnetic field sensor 110 may include magnetic field sensor 220, calibration module 240, and instant comparator 210. The magnetic field monitor also includes an optional block comparator 230 and accelerometer 225. Magnetic field sensor 220 may be a flux gate magnetometer sensor, a super conducting quantitative interference detector (SQUID), a magneto resistive sensor, spin electron relaxation frame (SERF) sensor or the like.

Magnetic field sensor 220 may sample environment 105 periodically at a pre-defined rate of time and generates a corresponding signal 130 for each sampling period. For example, the magnetic field sensor 220 may use a 1 MHz crystal to establish a nanosecond sample rate. The magnetic field sensor 220 outputs a signal 130 to instant comparator 210, calibration module 240 and optional block comparator 230.

The calibration module 240 may receive an output signal 130 from magnetic field sensor 220 and generate a relative baseline signal 280. For example, after the calibration module 240 receives an initial time periods worth of signals 130, the calibration module 240 may average the signals 130 and generate a relative baseline signal 280. In other words, the relative baseline signal 280 is similar to a calibration, recalibration, zero or baseline for the particular environment 105 being monitored. In one example, the relative baseline signal 280 may be a relative value and not an explicit magnetic field strength value.

The instant comparator 210 may perform a comparison between the signal 130 and relative baseline signal 280 to recognize a change in environment 105. When the resultant difference between the magnetic field of the environment 105 and relative baseline signal 280 is greater than or equal to a pre-defined difference threshold, the instant comparator 210 provides an output signal 115.

The instant comparator 210 in an example may not use an actual magnetic field strength value as the threshold value, but may instead use a threshold value related to the difference between the signal 130 and the relative baseline signal 280. Thus, in an example, neither the signal 130 nor the relative baseline signal 280 need include a specific or quantified value for magnetic field 110 as long as the magnetic field sensor 220 provides a consistent representation of the magnetic field 110 in the signal 130. However, in another embodiment, the signal 130 and/or relative baseline signal 280 may include a specified value related to the magnetic field 110.

For example, the threshold value may be based on the absolute value of the difference between the signal 130 and the relative baseline signal 280. By using the absolute value of the difference, the instant comparator 210 is well suited to recognizing changes in magnetic field 110 that increase the field strength as well as changes in magnetic field 110 that reduce the field strength.

The optional block comparator 230 may operate in a manner similar to the instant comparator 210, but may be calibrated to recognize changes in the magnetic field 110 over a greater time period than the instant comparator 210. When the change over time for the relative baseline signal 280 is greater than or equal to a pre-defined threshold, the block comparator 230 may provide an output signal 115. Further details of operation are described in the incorporated by reference '228 patent.

The optional accelerometer 225 may be used to provide motion and orientation information to the sensors 110. For example, if one or more of the sensors 110 were hanging from a tree, rolled across the ground, bumped, rotated, moved or the like, the accelerometer 225 may provide orientation and motion information that would allow sensors 110 to maintain its calibration. Further details of operation are described in the incorporated by reference '228 patent.

With reference now to FIG. 3, a block diagram of an I/O controller 145 and a sensor event assessor 150 is shown in accordance with an example. Although in this example, the I/O controller 145 is shown as distinct from the sensor event assessor 150, and in another example, the I/O controller 145 may be located within a sensor event assessor 150.

In an example, the I/O controller 145 includes a multi-channel sensor input 360, an electronic signal receiver 365, a signal combiner 368 and a single channel output 370. In yet another example, the multi-channel sensor input 360 provides two-way communication with the plurality of sensors 110, each of the plurality of sensors 110 having its own channel, such as 115A and 115B. The electronic signal receiver 365 may receive electronic signals from one or more of the plurality of sensors 110 at a pre-defined sample rate. The signal combiner 368 may bundle the electronic signals from one or more of the plurality of sensors 110 into a single electronic signal 115. The single channel output 370 may provide the single electronic signal 115 to the sensor event assessor 150.

For example, the I/O controller 145 may receive the multi-channel output signals 115A and 115B and combines them into a single channel 115 that is passed to sensor event assessor 150. Moreover, the I/O controller 145 can also communicate with each of the sensors 110. For example, the I/O controller 145 is capable of adjusting the sample rate of one or more of the sensors 110. In addition, the I/O controller 145 may adjust the power consumption of one or more sensors 110. The I/O controller may additionally monitor, organize, cascade, utilize and otherwise interact with each of the sensors 110.

In yet another example, the I/O controller 145 may also automatically adjust the baseline settings of one or more of the sensors 110 in the network based on one or more other sensors 110. For example, if a rogue sensor is providing an output signal that is outside of the normal (with respect to other sensors 110 in the network), I/O controller 145 may provide a calibration update to the rogue sensor to the appropriate baseline. In so doing, a network wide baseline or calibration can be automatically achieved.

In yet another example, the sensor event assessor 150 may receive the output signal 115 from the I/O controller 145 and provide assessment information 345 in a user accessible format. The sensor event assessor 150 may include an event detection receiver 310, a filter module 320, an evaluation module 330 and a user recognizable output generator 340. Event detection receiver 310 receives an electronic output signal 115 related to an event detected by sensors 110 as described in detail in FIGS. 1 and 2.

The filter module 320 may compare the electronic output signal 115 with a predetermined event detection threshold. In other words, the electronic output signal 115 is passed through filter module 320 if the electronic output signal 115 is greater than or equal to the predetermined event detection threshold. The evaluation module 330 may receive the electronic signal from the filter module 320 and provide assessment information about the event. The assessment information may be based on previously trained information stored in a database 335. User recognizable output generator 340 provides the assessment information 345 about the event in a user recognizable format. Further details are described in the '228 patent. Other system information 390 may be accessed and a database 335 store data as described in the '228 patent.

Figure 4A:
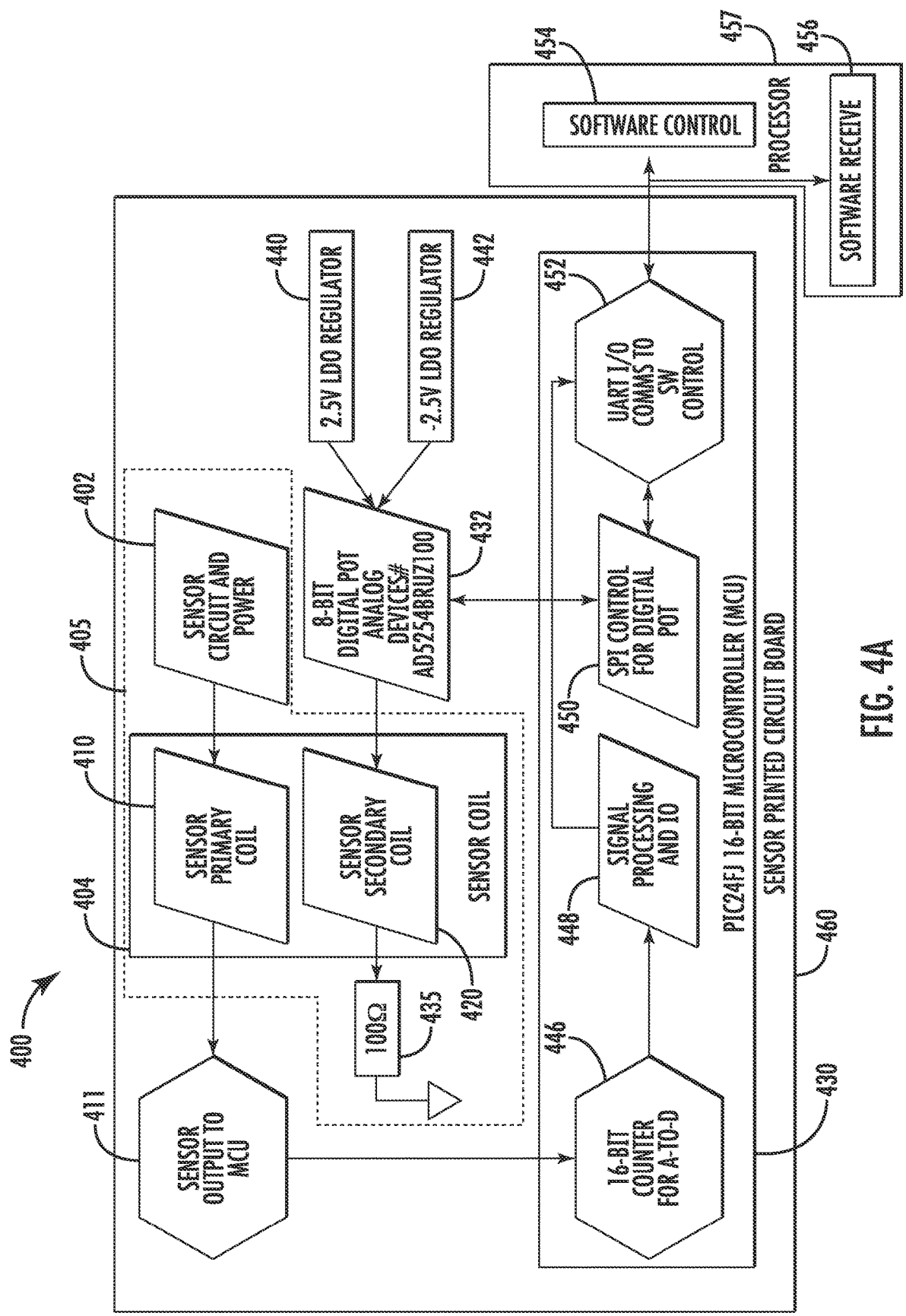
FIG. 4A is a block diagram of a magnetic field monitor in accordance with a non-limiting example.
Figure 5:
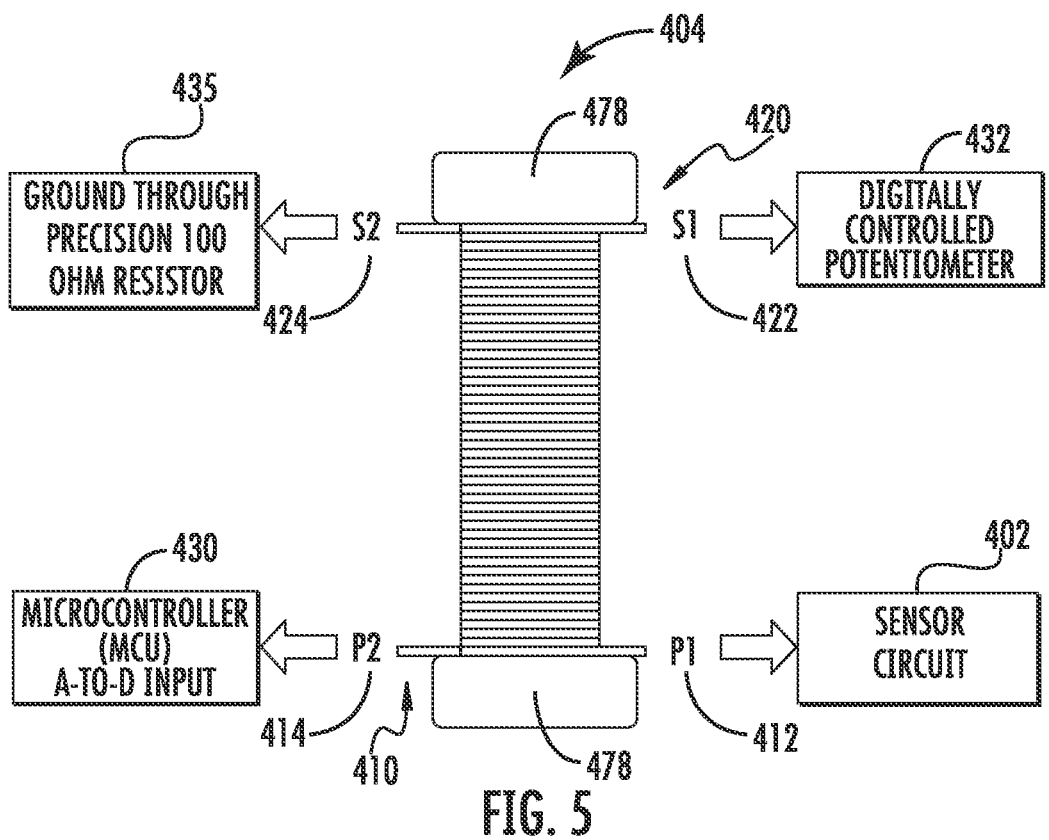
FIG. 5 is a fragmentary block diagram showing components connected to the primary coil and secondary, overwinding coil wound on the sensor bobbin in the magnetic field monitor of FIG. 4A.
Figure 6:
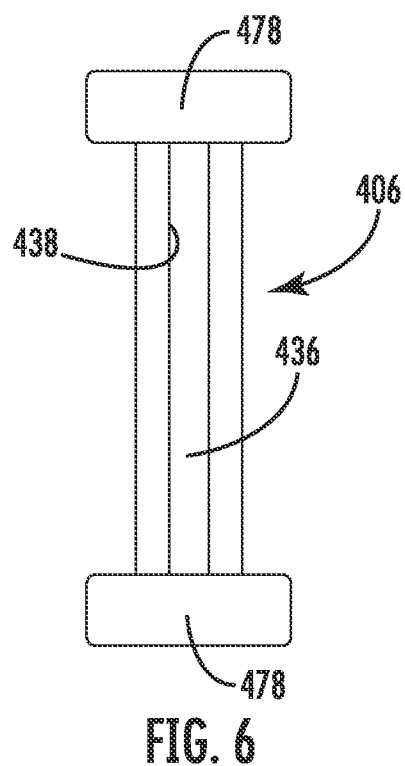
FIG. 6 is a top plan view of the sensor bobbin of FIG. 5 without wound coils thereon.
Figure 7:
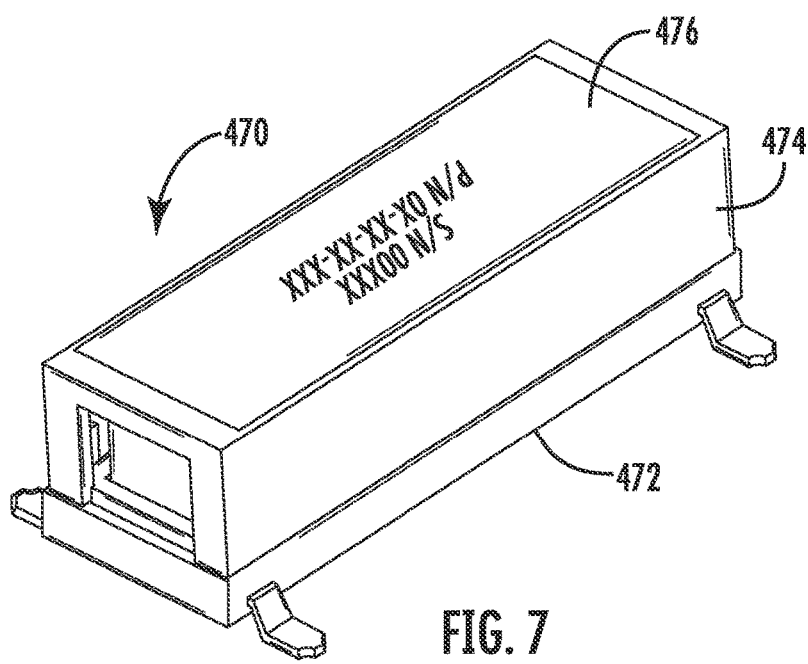
FIG. 7 is an isometric view of the carrier that holds sensor coils and sensor bobbin.

Referring now to FIG. 4A, there is illustrated a block diagram of the magnetic field monitor 400, such as described in the incorporated by reference '601 application, and also described as a magnetic field sensor that has the automated quantitative calibration and includes the major components of the magnetic field sensor circuit 402 and includes a power supply in this example, and is configured to generate an electronic signal at a time period representing a magnetic field of the environment. This magnetic field sensor 400 includes the sensor circuit 402 and a sensor coil 404, also termed a sensor transducer or sensor transducer assembly, that includes a sensor bobbin 406 (FIG. 6). As better shown in FIGS. 5 and 6, a primary coil 410 is wound on the sensor bobbin 406 as an inner coil and includes first and second ends 412, 414 and a secondary, over-winding coil 420 is wound on the sensor bobbin 406 as an outer coil and includes first and second ends 422, 424. The sensor coil 404, or sensor transducer and sensor circuit 402, form a magnetic field sensor 405 that is outlined by the dashed lines in FIG. 4A, although one or all components could form the magnetic field sensor, such as the potentiometer and other components described below. The sensor circuit 402 is connected to the first end 412 of the primary coil 410 and a controller 430 as a microcontroller (MCU) with an analog-to-digital input as an example is connected to the second end 414 of the primary coil. A digitally controlled potentiometer 432 is connected to the first end 422 of the secondary, over-winding coil 420 and operatively connected to the controller 430 as shown in FIG. 4A. The second end 424 of the secondary, over-winding coil 420 is connected to ground 435 via a precision 100 ohm resistor.

In an example, a self-calibrating module 240 and other components, such as described relative to FIG. 2, may be connected to the magnetic field monitor 400 and may calibrate as described with the circuits of FIGS. 1-3. The calibration module 240 may be configured to generate a relative baseline signal based on an average value of the electronic signals generated at previous time periods to represent the magnetic field of the environment. The comparator 210 may calibrate and may be configured to determine a difference between the relative baseline signal and electronic signal and generate a calibrated output signal if the difference is greater than or equal to the threshold. When a calibrated output signal is not generated, the controller 430 and digitally controlled potentiometer 432 may be configured to operate the sensor transducer 404 and other components to obtain a quantitative linear output.

The controller 430 may be configured to generate a sensor response curve as described later and convert a non-linear output of the sensor transducer or sensor coil 404 to a quantitative linear output. A plurality of the magnetic field sensors 405 may be used and a calibrator 240 connected to each of the magnetic field sensors and configured to generate the relative baseline signal based on the average value of the electronic signals from each of the magnetic field sensors. In an example, the sensor input/output controller 145 (FIG. 3) may be connected at the calibration module 240 and output signal 115 and have a signal combiner to combine the electronic signals from the plurality of magnetic field sensors into a single electronic signal. The sensor event assessor 150 may be connected to the sensor input/output controller 145 and configured to receive and process the single electronic signal to provide assessment information about a sensed event.

The sensor bobbin 406 (FIG. 6), as will be described in greater detail below, includes a metglas core 436 that is received within a trough 438 of the sensor bobbin. In an example, the digitally controlled potentiometer 432 is an 8-bit digitally controlled potentiometer, for example, an analog device number AD5254BUZ100, and is configured to sweep a voltage from negative to positive over the secondary, over-winding coil 420 and provide a changing voltage to the secondary, over-winding coil. Each different voltage produces a current that changes the output frequency of the sensor transducer assembly, or sensor coil 404. In an example as shown in FIG. 4A, a positive low-dropout (LDO) voltage regulator 440 of about 2.5 volts may be connected to the digitally controlled potentiometer 432 and a −2.5 volts LDO voltage regulator 442 may be connected to the digitally controlled potentiometer 432 to provide a sweep of voltage from −2.5 volts to +2.5 volts.

As shown in FIG. 4A, the controller 430 may include a counter 446, a signal processing and input/output circuit 448, a serial peripheral interface (SPI) 450 connected to the digitally controlled potentiometer 432, and a universal asynchronous receiver-transmitter (UART) communications controller 452 that interoperates with software control 454 that may include external software receive 456, which may be included and processed via a processor 457, which could be part of the controller 430 or separate. In an example, the counter may be a 16-bit counter for analog-to-digital conversion, where the sensor output 411 is received from the sensor primary coil 410 and passed into the 16-bit counter. The SPI controller 450 may help control operation of the digitally controlled potentiometer 432. In an example, the controller 430 could be a PIC24FJ 16-bit microcontroller.

The different components may be positioned on a sensor printed circuit board (PCB) 460 as a non-limiting example.

As will be explained in greater detail below, the voltage to the secondary, over-winding coil 420 approaches zero at the midpoint of the digitally controlled potentiometer 432 voltage sweep. The electronic ground 435 includes a tolerance resistor, which in this example is a 100 ohm resistor, and is connected to the second end 424 of the secondary, over-winding coil 420 (FIG. 5). The controller 430 may be configured to update a sampling rate of the magnetic field sensor 405, and in a preferred example, the magnetic field sensor comprises a multi-axis magnetic field sensor having primary axes oriented in different positions relative to magnetic North and having a non-linear output channel at each axis, which in an example, are three channels for the X, Y and Z-axes.

Referring again to FIG. 4A, the magnetic field sensor output 411 is a frequency, in kilohertz, and received at the controller 430. A known voltage moves through a known number of turns in the secondary, over-winding coil 420 through a specific resistance and allows a known magnetic field referring to the Bio-Savart Law as explained below. At any given setting of the digitally controlled potentiometer 432, the known magnetic field is able to be calculated. The digitally controlled potentiometer 432 is controlled by the controller 430 and the potentiometer in one example will provide a varying voltage in a linear fashion for each setting, from one supply of voltage at the "zero" setting, and the second supply voltage at the number 255 setting. The software, such as part of the controller or separate processor 457 for the monitor 400, controls the controller 430 to start a setting zero, and the software logs the magnetic field.

The controller 430 receives the frequency output and communicates the value to the software, which logs this value of the magnetic field as a function of frequency. The controller 430 (or other device) may include a database memory for storing such values. This process may be repeated 255 more times for each potentiometer 432 setting to provide a relationship of the magnetic field to the frequency. The software as part of the program and the controller 430 or other processor calculates the change in frequency per potentiometer setting to find the gain as a change per unit. The maximum gain is chosen by the software and communicates to the controller 430 to set the digitally controlled potentiometer 432 to that value with the highest gain to operate in a "sweet spot," as will be explained in greater detail in an example below. The software chooses 20 positions (ten higher and ten lower) of potentiometer settings and uses the frequency response and the known values of the magnetic fields at those settings to calculate a response curve. This response curve may be a six order polynomial fit over the 21 (the 10 lower, the center point, and the 10 higher) potentiometer settings. When a calibration loop is complete, the polynomial fit acts as a transfer function to calculate the magnetic field in real time by converting change in frequency to change in magnetic field. Post-calibration, the controller 430 outputs the measured frequency sensor value and the software converts it to a calibrated magnetic field value.

Figure 4B:
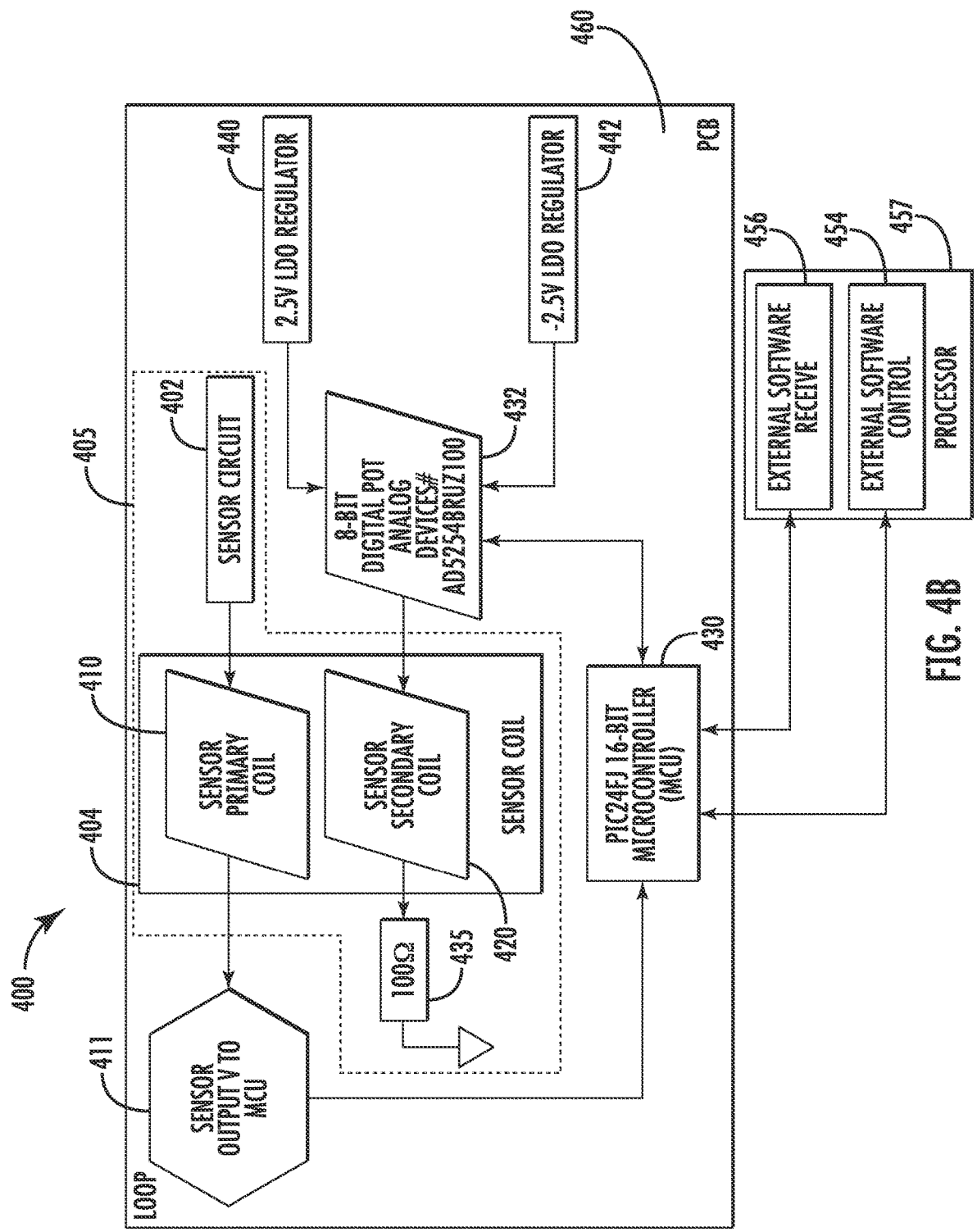
FIG. 4B is a block diagram similar to that of FIG. 4A and showing a flow sequence in operation of the magnetic field monitor.

FIG. 4B illustrates an auto calibration flow sequence in a calibration loop, where the magnetic field sensor output is a frequency as described above and the software operating with the controller 430 directs the controller 430 to set a potentiometer 432 value to a value "zero." The magnetic field sensor output for a sample is "0a" and the microcontroller outputs 0a to the software and receives five samples: 0a, 0b, 0c, 0d, and 0e. The software average is the five samples and logs the sample 0ave as the zero average. This process is looped 250 more times for the potentiometer setting 1, 2, 3 . . . 255. Logged values from the 0ave to the average of the 255 settings (255ave) are fit to the 6th order polynomial equation and the delta frequency per potentiometer change is calculated to find the maximum response (gain) of the sensor coil 404. The software instructs the controller 430 to set the digitally controlled potentiometer 432 to a value with the maximum gain, which is also known as the "sweet spot." The values for each discrete value that are 10 values above and 10 values of the potentiometer setting below the sweet spot are established and the 21 potentiometer setting values are used to fit with the 6th order polynomial function. This polynomial fit becomes a translation function and the software operating the controller 430 uses this function to calculate the real-time magnetic values over the 21 potentiometer ranges, also known as the bandwidth.

Figure 8:
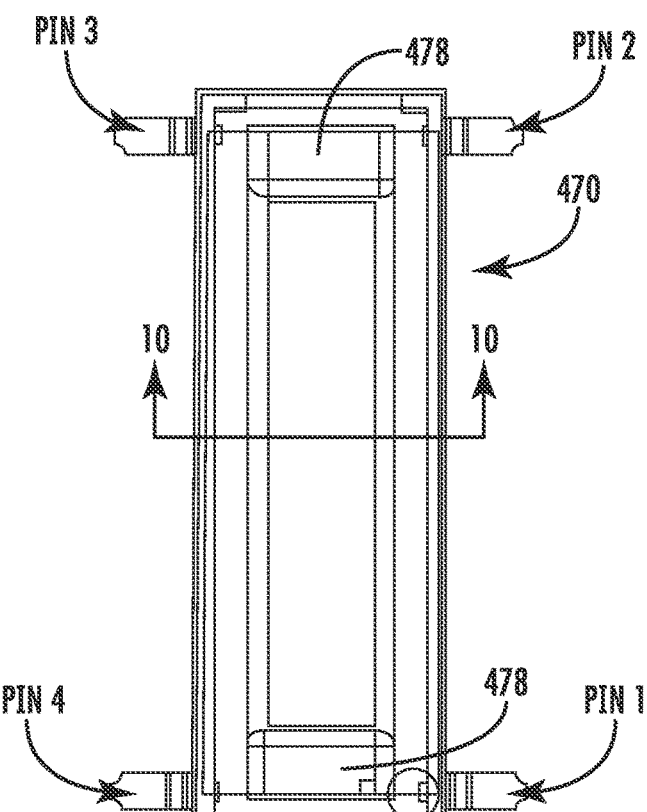
FIG. 8 is a fragmentary top plan view of the sensor carrier showing the sensor bobbin and wound sensor coils.
Figure 9:
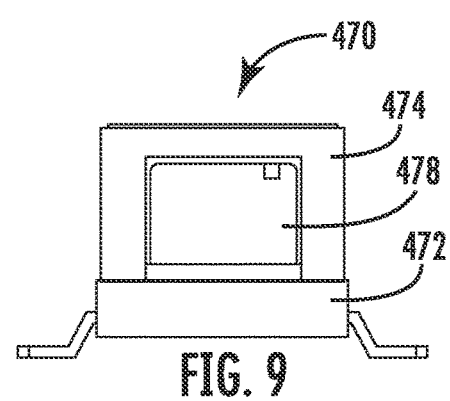
FIG. 9 is an end view of the sensor carrier of FIG. 7.
Figure 10:
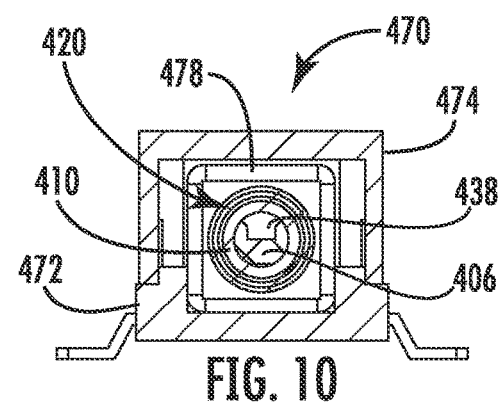
FIG. 10 is a sectional view of the carrier of FIG. 8 taken along line 10-10 of FIG. 8.
Figure 11:
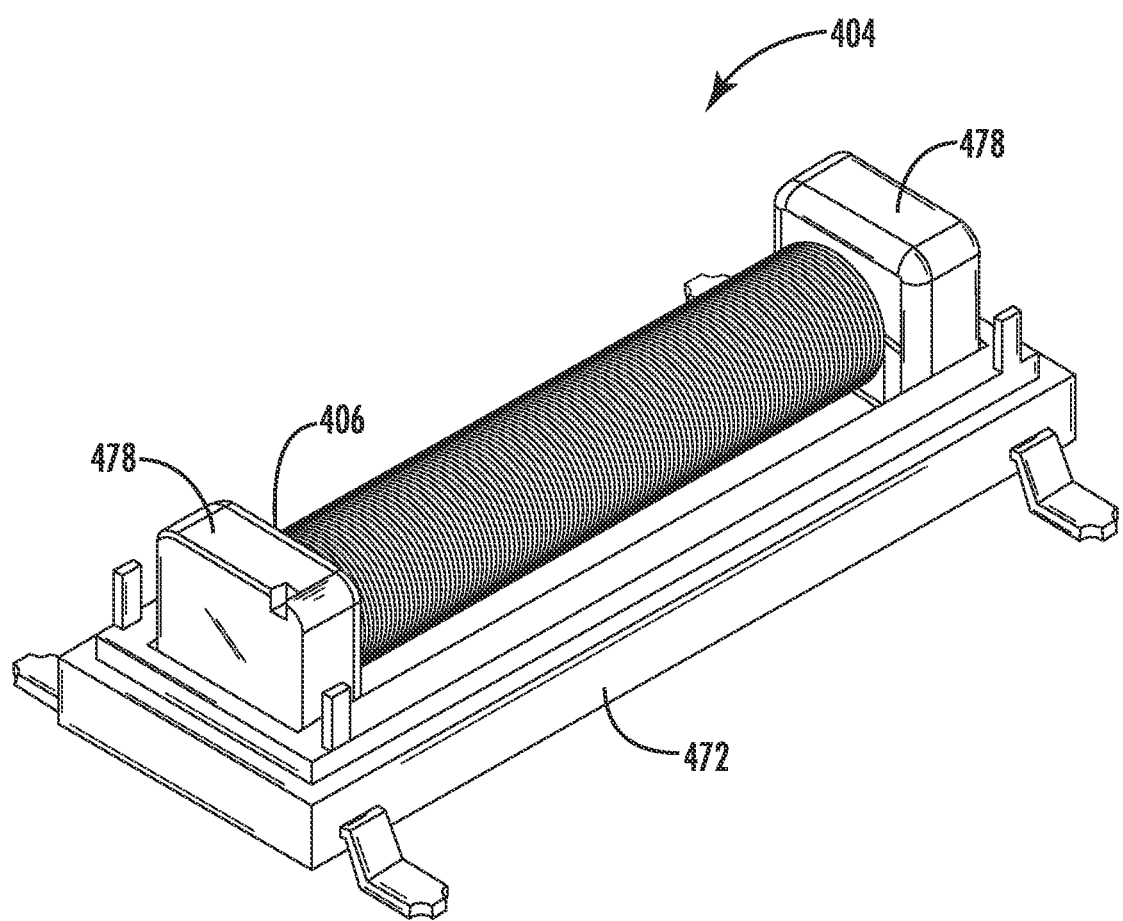
FIG. 11 is an isometric view of the sensor bobbin and wound sensor coils received on the carrier support.

Referring now to FIGS. 7-11, there is illustrated generally a carrier 470 for the sensor bobbin 406 and the sensor coils 410, 420, which are received over the sensor bobbin and its core 436 received in the trough 438 (FIG. 6). The sensor coils 410, 420 are constructed using known coil wire and bonding, for example, NEMA MW 29-C with 36 PN bond, and the wound sensor bobbin 406 is received on a lower carrier support 472 that receives a carrier housing cover 474 and top plate 476. The end view (FIG. 9) shows the head or end 478 of the sensor bobbin 406 (known as the bobbin head 478) and the sectional view (FIG. 10) shows the sensor bobbin 406, core 438 as a core ribbon, and sensor coils as the primary coil 410 and secondary over-winding coil 420. As shown in FIG. 8, the carrier support 472 includes four pins labeled PIN 1 to PIN4 for connecting to the printed circuit board 460. In a non-limiting example, the carrier 470 may be about 20 millimeters in length (20.320 in one example) and about 5.7 by about 6.6 millimeters in cross-section. The sensor bobbin 406 with the primary coil 410 and secondary over-winding coil 420 wound thereon is received in the bottom surface of the carrier support 472. The carrier support 472 includes the four pins that are numbered PIN1 to PIN4 and have the respective ends of the coils 410, 420 connected thereto. An example completed sensor bobbin 406 with wound coils 410, 420 and received on the carrier support 472 is shown in FIG. 11 with the bobbin heads 478 secured in the carrier support 472.

Figure 12:
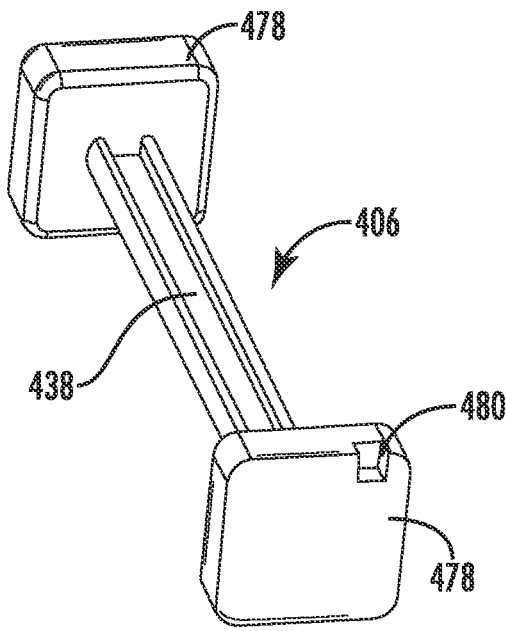
FIG. 12 is an isometric view of the sensor bobbin.

Referring now to FIG. 12, there is illustrated the sensor bobbin 406, which includes the enlarged rectangular configured ends as the bobbin heads 478. The sensor bobbin 406 may be about 18 millimeters long and includes the trough 438 formed within the central portion and is about 15 millimeters long in this example. The trough 438 may be about 0.5 millimeters, and in an example, about 0.476 millimeters in depth by about 0.8 millimeters, and in an example, 0.78 millimeters in width. These dimensions can vary. The core 436 is received within the trough 438 of the sensor bobbin 406, such as by Loctite 401 adhesive as a non-limiting example. For example, about 0.001 milliliter of Loctite 401 adhesive may be applied in the trough 438 and the core 436 inserted. The core 436 may be ribbon configured, in an example, and is inserted into the trough 438 with the adhesive and is pressed down for about 20 seconds to allow the Loctite 401 to cure for one minute.

Figure 13:
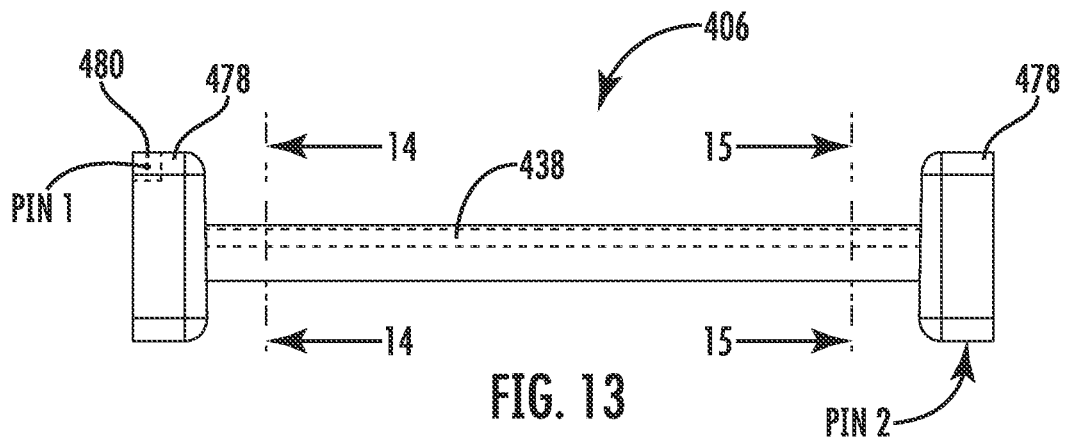
FIG. 13 is a front elevation view of the sensor bobbin.
Figure 14:
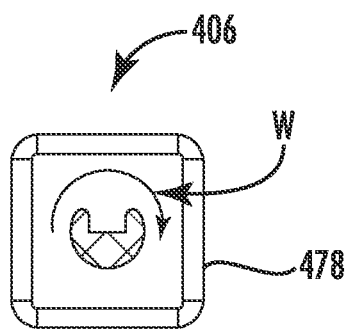
FIG. 14 is a sectional view of the sensor bobbin taken along line 14-14 of FIG. 13 showing the winding direction of the primary coil.
Figure 15:
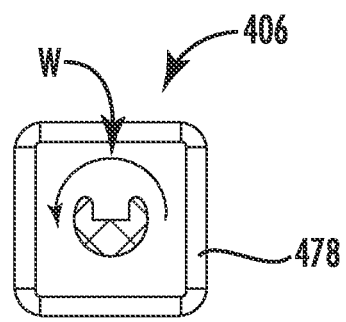
FIG. 15 is a sectional view of the sensor bobbin along line 15-15 of FIG. 13 showing the winding direction of the secondary, over-winding coil.

Referring now to FIGS. 13-15, there are illustrated the front elevation view (FIG. 13) of the sensor bobbin 406, also termed coil forming bobbin, and in FIG. 14, the sectional view taken along line 14-14 of FIG. 13 and showing the winding direction (W) for the primary coil 410 and in FIG.

15, the sectional view along line 15-15 of FIG. 13 showing the winding direction (W) for the secondary, over-winding coil 420. The primary coil 410 is the first coil that is wound. The process for winding starts with a coil wire such as NEMA MW 29-C 36 PN bond to pin number 1 toward the end of the inner face of the bobbin head 478 at the square notch 480 (FIG. 12). The primary coil 410 is wound clockwise from PIN1 in the direction of the arrow onto the coil forming sensor bobbin 406, starting in contact with the inner face of the bobbin head 478. In an example, four layers of 97 to about 100 turns per layer are accomplished with each layer to be within about one turn of the first layer, ending at PIN4, which is the same end as PIN1. The layer of turns is adjusted to fit between the ends. The bond point and four layers are shown in the primary coil 410 of FIG. 16, showing the end of the coil with the stepped configuration, corresponding to the four layers.

For the secondary, over-winding coil 420, the coil wire is also made from NEMA MW 29-C 36 PN and the end wire is bonded to start the winding onto PIN2 at the end near the inner face of the bobbin head 478 and it is wound counter-clockwise from PIN2 and in the direction of the arrow as shown in FIG. 15 onto the sensor bobbin 406 and in contact with the inner face of the bobbin head and with the primary coil 410. Two layers of 97 to about 100 turns per layer may be wound with each layer to be within one turn of the first layer ending at PIN3, which is the same end as PIN2, and the layer turns are adjusted to fit between the ends. An example of the two layers is shown in the secondary coil of FIG. 16 showing the stepped configuration.

Figure 16:
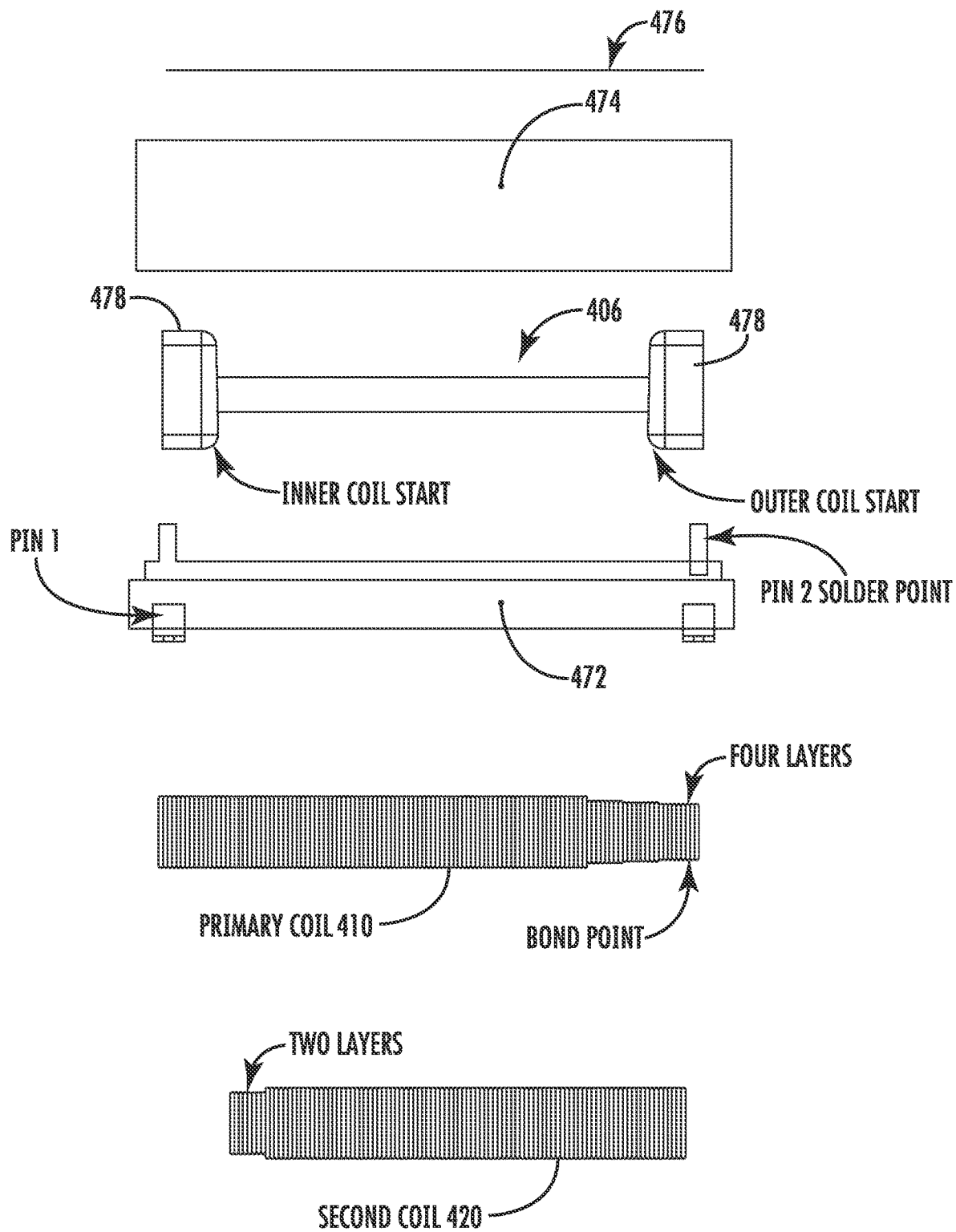
FIG. 16 is an exploded view of components from the sensor transducer, including the carrier components, sensor bobbin, primary coil, and secondary, over-winding coil.

Once the sensor bobbin 406 is wound, it is set within the carrier support 472 (FIG. 11) and as shown in the exploded view of FIG. 16, which shows the carrier support, the upper carrier housing cover 474, and the top plate 476 and the primary coil 410 and secondary over-winding coil 420. The sensor bobbin 406 is set within the carrier support 472 and the inner, or primary coil 410 is soldered starting at its wire to PIN1 and ending the other wire at PIN4. The secondary, over-winding coil 420 as the outer coil is soldered starting with the winding at PIN2 and end with the wiring at PIN3. It is possible to glue the coil forming or sensor bobbin 406 with PIN1 marked upward from the carrier support 472 into the center of the carrier with adhesive such as RTV734. The edges of the carrier housing cover 474 are glued to the carrier support 472 with adhesive and the serial number label or top plate 476 is applied to the center of the top or carrier housing cover 474.

The inner or primary coil 410 has about four layers of 97 to about 100 turns per layer, with each layer within about one turn of the first layer. The secondary, over-winding coil 420 as the outer coil has about two layers of 97 to about 100 turns per layer with each layer within one turn of the first layer. The final assembly as shown in the carrier 470 of FIG. 7 may be soldered onto the printed circuit board 460 with other components as part of the magnetic field monitor 400. It is possible for the magnetic field monitor 400 to be supported by a drone or other support structure on a drone.

A non-limiting example of the magnetic field monitor 400 uses a 400 turn secondary, over-winding coil 420 placed over the sensor bobbin 406, also termed the transducer bobbin. However, it should be understood that a different number of turns may be used for the secondary, over-winding coil 420. One end of the secondary, over-winding coil 420 may be attached to the electronic ground 435 through the precision 100 ohm, 0.1% tolerance resistor. In this example, the second end 424 of the secondary, over-winding coil 420 is attached to this ground resistor 435 (FIG. 5). The first end 422 of the secondary, over-winding coil 420 is attached to a digitally controlled potentiometer 432, which is connected to both the positive 2.5 volt and a negative 2.5 volt power source, which in this example, are the respective LDO regulators 440, 442. The actual power sources 440, 442, both positive and negative, may have other higher or lower voltage values if additional bandwidth is required.

The digitally controlled potentiometer 432 in an example is 8-bit potentiometer, although the magnetic field monitor 400 could be used with a 10, 12, 24- or any other resolution source. The 8-bit potentiometer 432 has 256 different resistances, and as implemented, may be scanned, swept or locked into any one of the resistance settings, from values 0 to 255. The digitally controlled potentiometer 432 interfaces with the firmware-based controller 430 using an I2O interface. As is known, the I2C interface is a synchronous, multi-master, multi-slave, packet switched, single-ended serial computer interface. The software control initiates a sweep of the voltage sources from the negative 2.5 volts at potentiometer setting zero (C0') and as noted by ohms law (voltage=current x resistance), provides a slowly changing voltage supply to the secondary, over-winding coil 420, approaching 0 (zero) volts at the midpoint of the potentiometer sweep (position 128 on the 8-bit potentiometer) and continues up to the positive 2.5 volts (position 255 on the 8-bit potentiometer).

Each different voltage that is provided to the secondary, over-winding coil 420 produces a current (Ampere's Law), which changes the output frequency of the sensor transducer 404, i.e., the sensor coils. The values of the non-linear frequency response of the scan/sweep for all 256 supplied voltages (0.0195 volts per setting on the 8-bit potentiometer, i.e., 5 volts divided by 256, is recorded by the software within a memory to obtain a sensor response curve, as shown in the example graph of FIG. 17, which shows a frequency response curve of a sweep from potentiometer setting "0" (negative 2.5 volts) to setting 255 (positive 2.5 volts). The lines numbered X, Y, and Z represent the three channels for the X, Y and Z-axes. Each recorded potentiometer setting response is an average of five samples taken at 10 kHz (100 ms) sample rate. The sample rate may be slower or faster and the process will be the same. As an example for Channel X in FIG. 17, on the upward section of the curve, A is the midpoint and high gain area, B is the upper $10^{th}$ potentiometer setting position and C is the lower $10^{th}$ potentiometer setting, with D as the vertical height corresponding to the 6th order fit between C and B where "normalized" operating hovers around D.

Using the Biot-Savart Law, the supplied current (I) length (a) and radius (r) of the secondary, outer winding coil 420 permits the system to calculate a "Beta" (β) for the coil based on the permeability of the sensor transducer core 436 (μ0) and the turn-density, turns per inch (dl) per the below calculation (Biot-Savart):

$$= \oint \frac{\mu_0}{4\pi} \left[ \frac{Idl}{r^2 + a^2} \right] \cdot \frac{a}{\sqrt{r^2 + a^2}}$$

The result is a constant value ("Beta" (β)) for that magnetic sensor transducer 404 that allows the calculation of the output voltage (0.0195 volts per setting). Using Ohms Law (V=IR), in conjunction with the precision 100 ohm resistor as ground 435 from the first end of the secondary, over-winding coil 420 to ground, the system calculates the current (I) per setting (β/100 Ohms-Current) to allow the calculation of a precise value of Tesla, or more specifically, in an implemented case, milli-Tesla (mT), per setting on the digitally controlled potentiometer 432. This step calculates the conversion of the non-linear response of frequency to the known mT value for that specific potentiometer setting.

Figure 18:
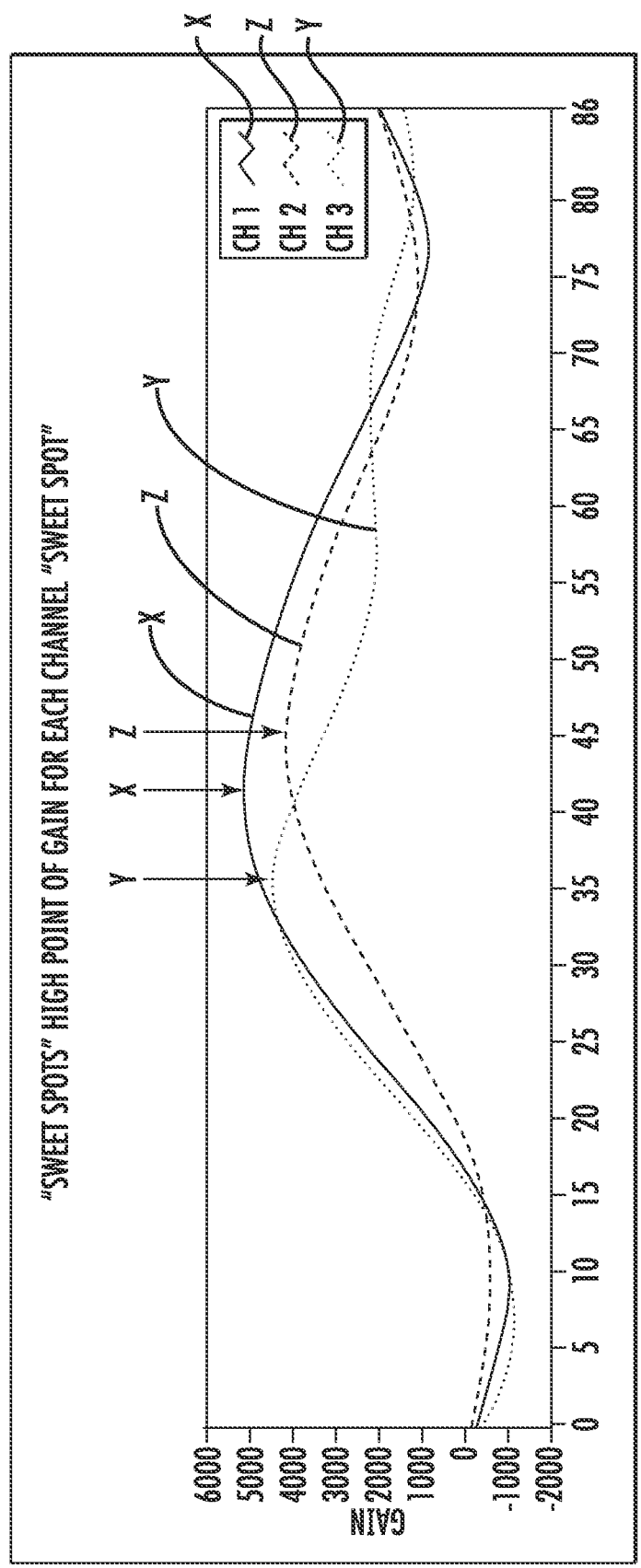
FIG. 18 is a graph showing the gain plot as a change in milliTesla per kilohertz change in the sensor calculated for each of three (X, Y and Z) axes from the sweep of the transducer over 256 settings.

Each resultant data point collected from the frequency scan is analyzed as a function of the change in mT (calculated from the change in frequency, the β and the 100 Ohm resistor) as a function of change in frequency per potentiometer setting. This provides a Gain plot of the change in mT per (ΔmT/kHz) per potentiometer setting to determine which potentiometer setting results in the maximum amount of response/change in the sensor transducer. The graph in FIG. 18 shows an example plot that is automatically derived from the sensor's Gain (ΔmT/kHz) as a function of potentiometer setting where the Gain (change in milliTesla per kilohertz change in the sensor) plot is calculated for each of the three (X, Y and Z) axes from the sweep of the transducer over the 256 settings from negative 2.5V to positive 2.5V using the resultant milliTesla calculation that Biot-Savart equation provided. The high point of the curve for each of the X, Y and Z axes corresponds to the "sweet spot" and the high point of gain for each channel.

Once the Gain plot is calculated, the software automatically picks the potentiometer setting where the Gain is at the maximum value for each channel independently. The three potentiometer values are set by the microprocessor/software or controller 430 and locked into that value as a center point, or what may be referred to as the "sweet spot." The controller 430 and software then calculates the linearization of curve surrounding the "sweet spot" by a 6th order polynomial-fit of the area. What area around the curve is polynomial-fit is a software-defined variable of the amount of potentiometer settings adjacent to the "sweet spot." The implemented case presently is 10 potentiometer settings higher and 10 potentiometer settings lower. This number may be changed depending on the desired bandwidth that is required. These polynomial fit calculations are stored in a configuration file within the memory, along with the other calculated values, including the "sweet spots," lower and upper frequency bounds (defined by the 10 potentiometer settings above and below the sweet spot) and stored in a non-volatile format. The polynomial fit acts as a translation function of the frequency output of the magnetic sensor transducer 404 and the resultant value in quantified magnetic units (Tesla) over the software defined upper and lower frequency range.

This provides a quantitative output reading of the magnetic sensor transducer 404 (for each and all channels/axes individually) that are updated at the sampling rate of the sensor network/system (as implemented at 10 Hz/100 ms). If the environment changes such that the frequency response of the sensors no longer fit the calculated translation function, or if the frequency is outside of the upper and lower limits, the software automatically indicates that the sensor transducer(s) are out of calibration.

The low-dropout (LDO) regulators 440, 442 each may be a DC linear voltage regulator, which may regulate the output voltage even when the supply voltage is close to the output voltage. These devices have advantages over other DC to DC regulators because they have an absence of switching noise and a smaller device size that is advantageous for these types of sensors as described. It should be understood that other hardware components may be used such as described relative to FIG. 5 in the incorporated by reference '228 patent, and may include the operating system, applications, different models and data that work with a computer peripherals such as computer readable media, including one or more processors, the computer usable memory such as ROM, or volatile memory, such as RAM, a data storage unit and signal generating and receiving circuitry. These circuits may interoperate through a bus into a display, an alphanumeric input, a cursor control, different input/output devices, and communications interfaces.

Further advancements have been made regarding intelligent assessment as part of a Sensor Assessment Network (SAN), which may use sensed data to determine physical features of a target and localize, track, and/or identify a target. Assessments may be made, which includes spatial location in one, two or three dimensions. The assessments may include velocity components and forward predictions of the location at some future time for the trajectory of the sensed object, such as a magnetic dipole. For example, the target could correspond to a hidden gun or knife carried by an individual passing through a security portal. It is possible to use a dot product algebra and partial derivatives for sensor assessments as will be explained in detail below.

A sensor assessment network (SAN) in this example operates as a magnetometer sensor network to calculate geo-spatial position in the x, y or z coordinates and obtain a true geodetic position for trajectory and velocity. The SAN may be used for security applications and detection of persons, e.g., an individual carrying a concealed weapon through a security portal. Self-normalized and self-calibrating data may be used. For example, a security portal may include a plurality of magnetic field sensors of the type described in FIGS. 4A and 4B, and sweep the frequencies as described above, and use the Biot-Savart response. The magnetic moment may be calculated to obtain an electromagnetic unit as an amp meter squared and a dipole measurement and use this data to obtain unknown values and solve for other variables that obtain for other sensor inputs. In the calibration, the devices as magnetic field sensors of a SAN may sweep through the digital potentiometers, and those frequencies may be recorded within a controller as one of the magnetic field sensors or a SAN controller and the average taken and linearized as to a non-linear curve with a polynomial and calculated dipole. Simultaneous equations may be solved and dot matrices used with partial derivatives of x, y, z, and velocity components.

It is possible to look at a function point of a signal and the sum of squares, including the center of a Gaussian curve, and know at a specific point in time and back calculate position. Once the SAN knows the position, it may calculate trajectory. It is possible to take the dot product of the partial derivatives of vectors to obtain a series of dot products with x, y, and z components for different channels, such as 12 channels corresponding to four magnetic field sensors.

Figure 17:
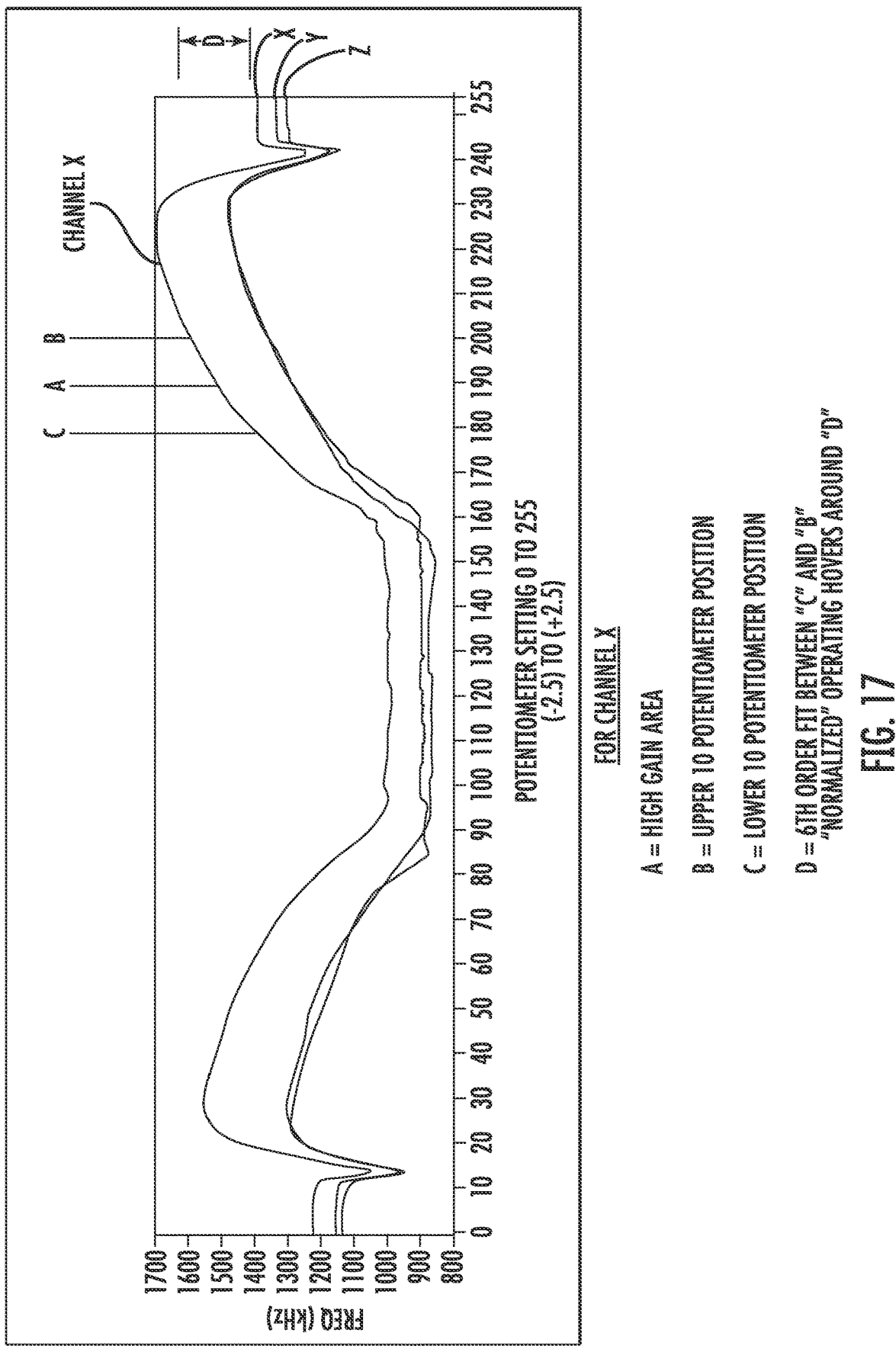
FIG. 17 is a graph showing the frequency response curve of potentiometer settings from "0" as −2.5 volts to setting 255 at +2.5 volts.

In this example, as described relative to FIGS. 17 and 18, a quantitative relationship is provided between the change in frequency versus the change in Tesla magnetic units, as compared to more typical magnetometry that uses the total field bias, and not the change in magnetic field from sample to sample, which the SAN may use. This data for one sensor may be used in conjunction with other sensors, such as in a security portal, and employ a plurality of magnetic field sensors that are spaced from each other within an environment to be monitored to define the sensor assessment network (SAN) for tracking a target having a magnetic dipole within the environment to be monitored.

Figure 19:
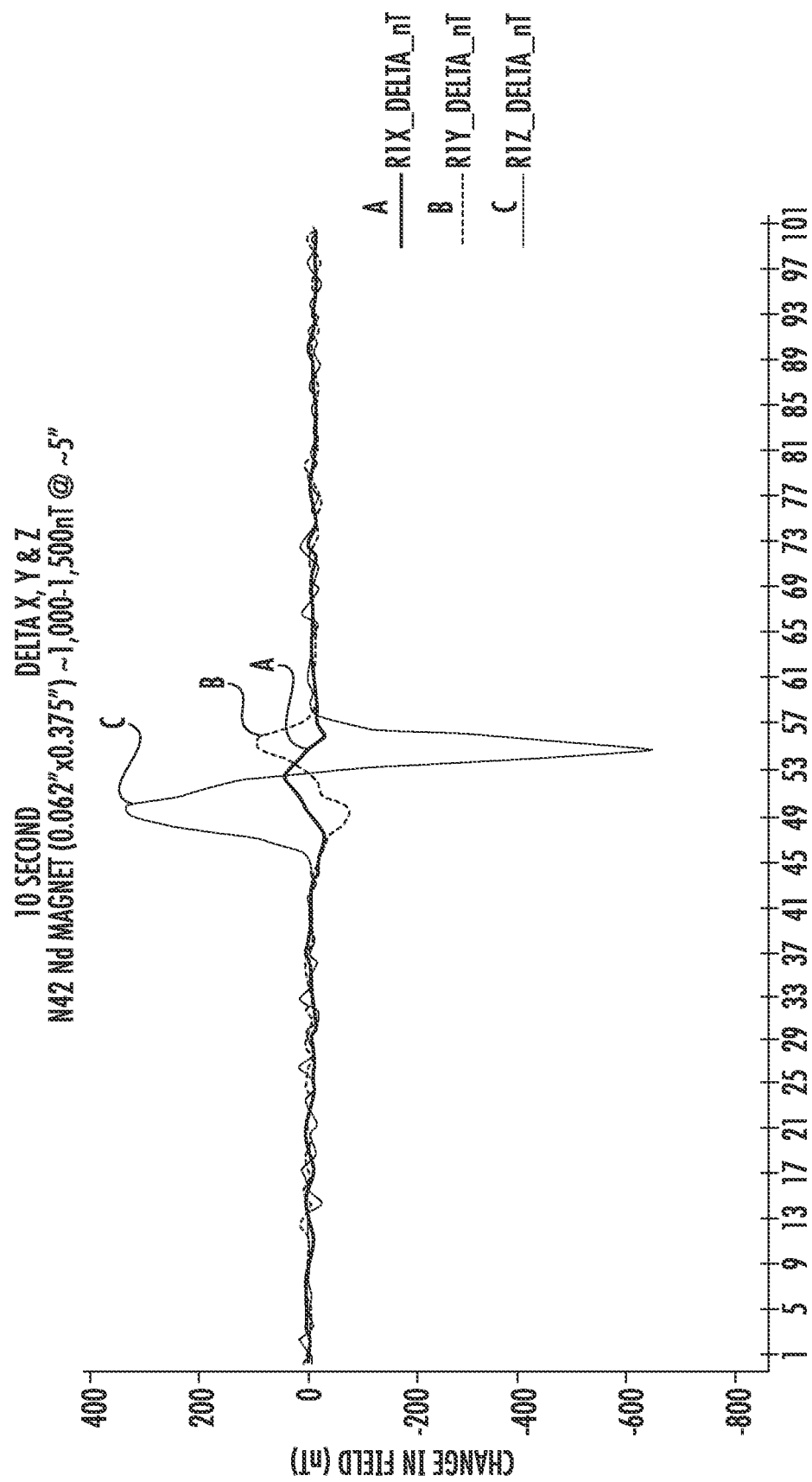
FIG. 19 is a graph showing the change in magnetic field and showing sample to sample differences in three sinusoidal X, Y, and Z components.

As shown in FIG. 19, the data of a single three-axis magnetic field sensor 400 as described above uses auto-calibration and auto-normalization. In this example, the sensor 400 was stimulated with an estimated about 1,000 nanoTesla (nT) to 1,500 nT signal. The sample-to-sample differences as the Delta of the nT are shown, illustrating the three sinusoidal components of the detected magnetic field as x, y and z. Each of the three components creates a summed total field and, in this case, a rough order of magnitude adding the range of each axis (X=20 nT to −10 nT=30 nT; Y=75 nT to −20 nT=95 nT; and Z is about 320 nT to −615 nT=935 nT), which together net a total measurement result of about 1,060 nT. The same data processing could also be used in a square root of the sum of the squares as a more conventional way to provide directly a total detected field. This measurement and data processing shows a detected signal level consistent with a N42 grade, Nd (Neodymium) magnet at about 4.5 inches to about 5 inches.

Referring now to the table shown in FIG. 20, the data results from two magnetic field sensors 400 are collected and x, y and z magnetic sensor channels for 300 samples are displayed. The results of processing this data provide low noise methods of obtaining precise and accurate information from each of the three channels in a magnetic field sensor 400, and are also consistent from sensor to sensor. This quantitatively accurate and precise data is repeatable and allows the application of various formulations to calculate different parametric data about the events as detected. The accuracy and precision for this data additionally allows the magnetic field sensors 400 to be used successfully in the sensor assessment network (SAN).

For example, four magnetic field sensors together have a total of 12 channels and it is possible to include a fixed time interval ($T_k$) in an applied case with 10 Hz or 100 ms samples from the 12 channels for the four magnetic field sensors, each having the three individual channels corresponding to the respective x, y and z channels. An unknown magnetic dipole (m), moving along a given trajectory at velocity (v) and heading ($r_0$) over a time interval (t) are variables to be determined. Knowing the calculated magnetic vector $B_{ij}$ at known locations can provide insight into the other unknowns of the velocity, heading, magnetic dipole, and the time interval. The calculation of $B_{ij}$ allows the magnetic field vectors to be calculated first over each sample at 100 ms time intervals, and then conversely, the trajectory information may be calculated. Using the $B_{ij}$, v, $r_0$ and t calculations, it is possible to determine the position of the magnetic dipole as a function of each of the individual channels, i.e., as little as one channel and as many as all 12, or more, and use expansions to a current iteration, to observe the event. For example, $B_{ij}=(B_{1ij}; B_{2ij}; B_{3ij})$; and are made at N known points in space at T moments in time. $B_{ij}$ are calculated at end points, and by knowing the time intervals, these values can be placed as positions. The $B_{ij}$ calculations may be used to back-calculate the velocity, heading, and other trajectory information, which is then used for each of the 1 to 12 or more channels to calculate the position at a specific moment in time.

Assuming there is a fixed trajectory of heading and velocity of the magnetic dipole moving past the sensor assessment network (SAN) with four magnetic field sensors arranged in a security portal, it is possible to use partial derivatives of the known, fixed quantities, i.e., the magnitude of dipole and velocity of movement calculated from the 100 ms sample progressions, and calculate unknown, fixed values. It is also possible to know that the summation vector of the x, y and z contribution to the total field is constant, so that the sum of the individual fields will net the same total field on any of the given magnetic field sensors, in a scalar, electromagnetic dipole unit, such as amp-meter squared, or $A.M^2$. By taking the partial derivatives of the x, y, z components and total vector, and knowing the relationship of the signal attenuation of a dipole is $1/r^3$, where r is the distance from the sensor transducer, it is possible to create matrix derivatives, each with respect to each other for each sensor node as a magnetic field sensor in a sensor assessment network. By taking that dot-product of the matrices of partial derivatives, it is possible to calculate, via simultaneous equations, the estimated r, $v_0$, t and m and other possible items for each of the sensor channels and observation of the event.

In an example, when simultaneously using the sum of the squares of the 12 independent sensor transducer channels as with the example of four magnetic field sensors in a security portal, it is possible to use a Gaussian fit to determine the center of an event, such as sensing a magnetic dipole as a concealed weapon where the sensed dipole is on the plane between the sensors, as shown in the graph of FIG. 21 with the arrow 500 pointing to the center of event. This allows a "time slice" to calculate the position and trajectory information of the event, and provide a "triggering" mechanism with a threshold to allow the implemented system to "alarm" or notify, for example, security officers, such as monitoring the security portal.

Figure 22:
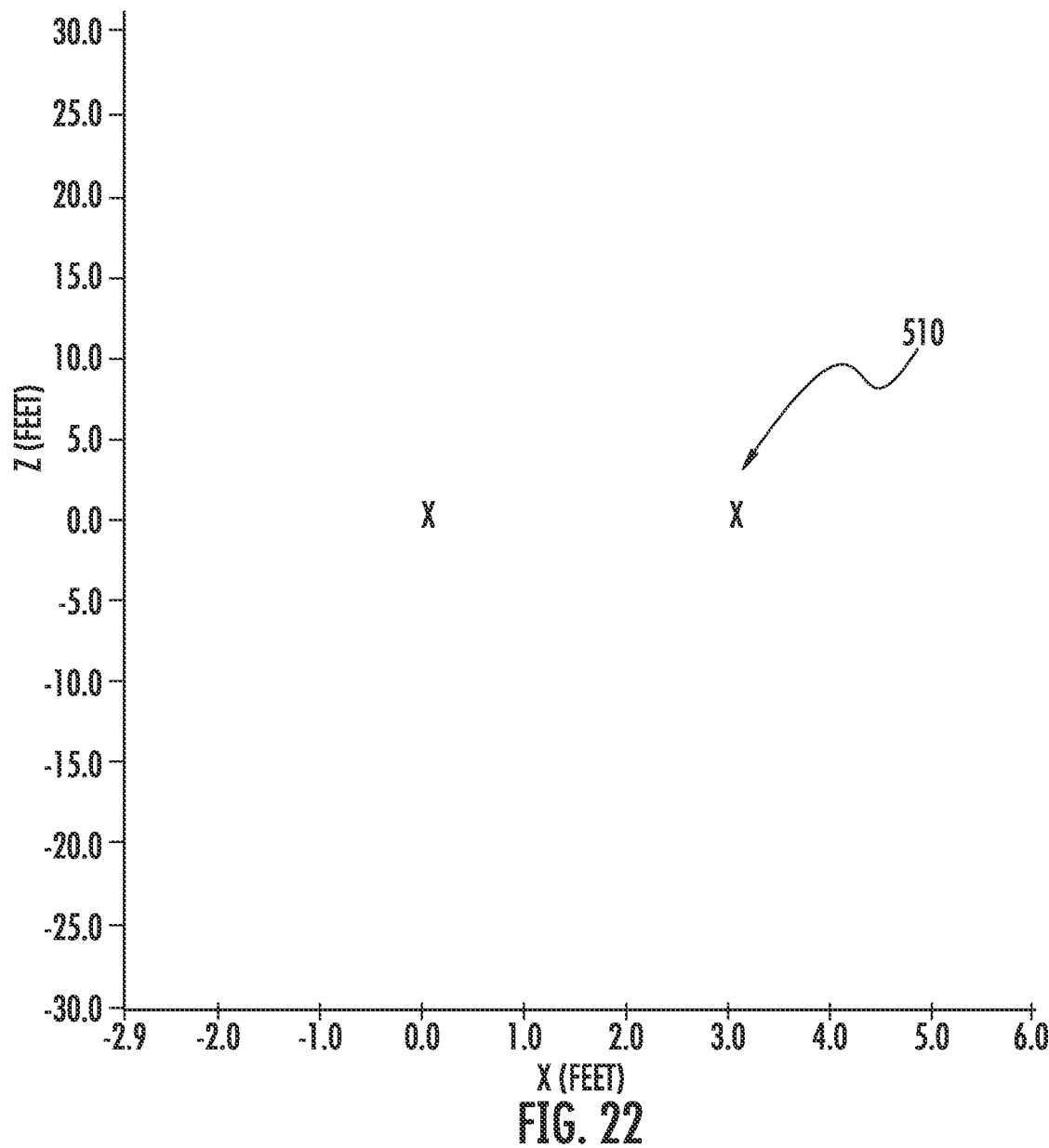
FIG. 22 is a graph showing a trajectory position of the Z-axis of a dipole in accordance with a non-limiting example.

Once the center of the event is determined, it is possible to know the Z-axis position of the dipole in the security portal, as being on a plane between the magnetic field sensors. This position may be inserted into a trajectory calculation along with data samples that are 100 ms before and after the event to determine the trajectory, including the velocity of a heading. These calculations, along with the calculated field strength, and the known position at the center of the event are used with the known partial derivatives to calculate a dot product of the partial derivatives of the known variables, including the specific geodetic position of the dipole with respect to the magnetic field sensors that form the sensor assessment network. For example, FIG. 22 shows implemented trajectory calculations as indicated by the arrow at 510 with "Z" in feet on the vertical axis and "X" as feet on the horizontal axis.

Figure 23:
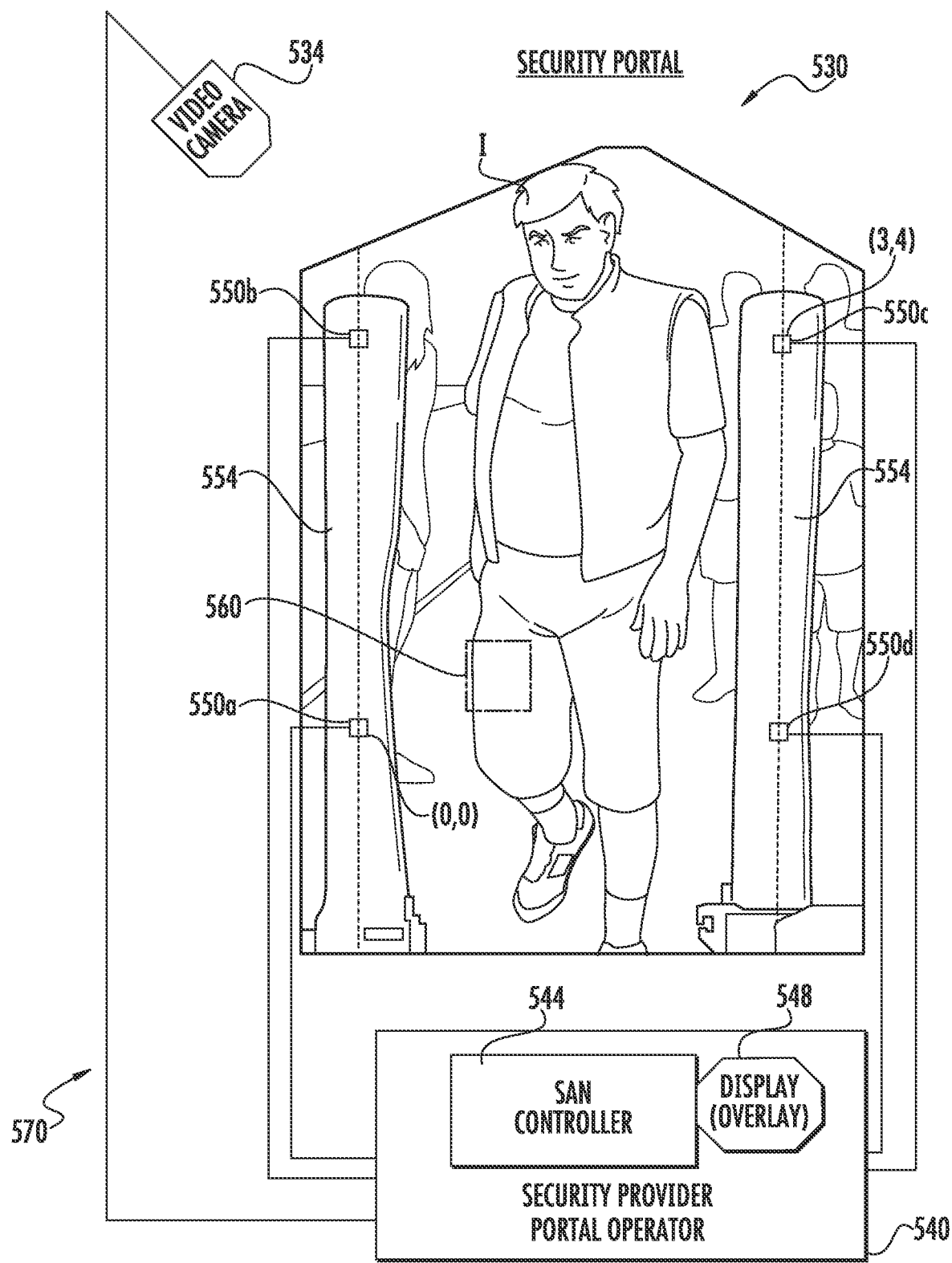
FIG. 23 is a diagram of a security portal and SAN in accordance with a non-limiting example.

Referring now to FIG. 23, there is illustrated a security portal at 530 and showing a camera, such as a video camera 534, that images the security portal. An individual (I) is shown walking through the security portal 530 and carries a concealed weapon or other concealed metallic object as a magnetic dipole, such as a knife. The video camera 534 is connected to a portal operator as a security provider 540 that includes a SAN controller 544 and display 548 connected to each other. Four magnetic field sensors 550a-d are illustrated and supported on a portal structure, such as poles 554 in this example. The magnetic field sensors 550a-d are configured in a rectilinear configuration on the poles 554. The four magnetic field sensors 550a-d connect to the SAN controller 544, which is configured to receive the magnetic field values as measured and determined for each x, y, z channel in each respective magnetic field sensor 550a-d and determine the magnetic field vectors of a target, in this example, the concealed weapon, over each sample. The SAN controller 544 may be integrated as a separate SAN controller as part of the security provider 540 near the security portal 530, or distant to it, or integrated into one of the magnetic field sensors 550a-d. Each sensor controller that is part of the respective magnetic field sensor as shown in the example of FIG. 4A may be configured to sample at about 100 ms intervals in timed relation to other respective sensor controllers. The SAN controller 544 may be configured to determine the magnetic field vectors of the target at known locations. For example, the SAN controller 544 may determine the trajectory of the target as a magnetic dipole based upon signal attenuation of the magnetic dipole and a dot-product of matrices of partial derivatives. The video camera 534 may be connected to the SAN controller 544 and positioned to image the security portal 530. The SAN controller 544 may be configured to generate an overlay 560 of the target position to an image of the security portal produced by the video camera 534 on the display 548. For example, the image of the security portal 530 as shown in FIG. 23 could be viewed on the display 548, and the overlay 560 as a rectangle showing the location of the concealed weapon would appear on the display, such as shown in FIG. 23 for the individual walking through the security portal 530.

The SAN controller 544 may reference a Cartesian coordinate system relative to the lower left magnetic field sensor 550a as coordinates 0, 0, which in this example was arbitrarily chosen as the reference for the x, y location. The X1, Y1 location could be the location of magnetic field sensor 550c. In a three foot security portal 530 as an example, this could correspond to (3,4) and for a four foot configuration could be (4,4), etc. The Z location may be the position of the center of the Gaussian fit, and is the time slice, for the current system, which is used to provide the photo or video feed to the operator viewing the display 548, which includes the overlay 560 as described. It may even be possible to determine general outlines of the "target" as the magnetic dipole and distinguish a knife from a gun based on calculated measurements and data processing at the SAN controller 548.

There now follows more details regarding some of the processing in the SAN controller 548 that may be incorporated for operation of the system.

The SAN controller 544 and magnetic field sensors 550a-d as described are an improvement over more simple target detection and together form a SAN 570, which operates to implement target assessment and use magnetic sensor data to determine physical features of the target and localize, track and/or identify the target. These assessments could include spatial location in 1, 2 or 3 dimensions, velocity components, and forward predictions of the target location at some future time. These assessments could also include properties of the target that might aid in the identification, such as net magnetic and/or electric dipole, and possibly higher order moments, and even acoustic signatures, IR or other EM spectrum intensity and temperature in some examples depending on sensor design.

Intelligent assessment using the SAN 570 may include indirect interference of the location, trajectory and physical properties of an object as a target that cannot be measured directly. For example, the object may be hidden, e.g., a concealed firearm on a single moving individual in a crowd. Intelligent assessment also may refer to assessing the properties of an object using limited information with what may be limited sensors. For example, the process of visual location may refer to a sophisticated process. If done by humans, it may involve pattern recognition by the trained human brain, and possibly other sophisticated technology, e.g., telescopic optics or other image handling, perhaps event satellite photographs. Intelligent assessment may be considered to refer to cases where the sensor data itself does not have a simple or direct relationship with the object of interest. Even if an individual were to monitor the data directly, it may not be possible to directly assess the target object, e.g., cases where simply looking at data itself would not directly reveal any feature of interest.

The SAN 570 in this example of FIG. 23 includes a plurality of magnetic field sensors 550a-d, which exchange data with each other in this example via the SAN controller 544. The sensors 550a-d could be wired or wireless and communicate with the SAN controller 544 and each other via wired or wireless connections. There is one magnetic field sensor 550a-d per spatial location, and each magnetic field sensor 550a-d may have sensor resources, computational resources, or both. Each magnetic field sensor 550a-d as a node may potentially have multiple sensors and be formed as multiple sensor types, and include computational resources of varying power via their internal controllers (FIG. 4A). There can also be sensor-only and computation-only nodes. The SAN 570 may include a set of distributed algorithms that run on the nodes with computational resources that make high-level assessment of the meaning of the data in real time. This SAN 570 architecture may be distinguished from sensor-monitoring networks (SMN) where the raw data is transmitted back to a central monitoring point in real time, and from ordinary data analysis where the data acquired from a sensor network is processed at a later time, and in a centralized location. Constraints may also be imposed on the transfer of data between nodes as the magnetic field sensors in this example. For example, the individual magnetic sensor nodes may transmit data to other nodes when some condition is met, or intermittently in time. In this respect, subsets of the node or even a single node can be considered as a sub-SAN, e.g., it may perform its own sub-assessment on its data and decide whether to transfer its assessment, and possibly its raw sensor data to another node where it can be used for an assessment over a larger portion of the SAN 570.

Real-time assessments of the data reflect best estimate inferences of the physical state of interest within a monitored region, such as in the security portal 530 as illustrated. The SAN 570 may be applicable when the primary information of interest may not, or cannot be directly monitored, and thus, may be inferred indirectly from other data. More relevant are targets that move through or may be present or absent in the region of interest. In an example, targets are objects of interest that have a specific location in space at a given time and may have a velocity and physical characteristics that may be useful in identifying the target. The target may be identified by magnetic field as detected, for example, as shown in the example of the security portal 530 in FIG. 23.

A magnetic field sensor component or channel, such as the x, y or z channel, may be defined as a stream of sensor outputs, e.g., single numbers, at known times and at a constant sampling rate. However, this may not always be required. For example, a magnetic field sensor 550a-d may sense the magnetic field, i.e., a vector quantity, and may have three components or x, y and z channels associated with the same physical location node, in this case the magnetic field sensor, and sampled at the same times. The output at time to of a single channel indexed by k may be defined as a data stream or time series of samples with a time stamp $t_k = \{t_{k1}, t_{k2}, \ldots t_{kmk}\}$ from each channel, $$X_k = \{X_{kt} : t \in T_k\} \in \Re^{M_k}, t_0 - \tau \leq s \leq t_0, \forall s \in T_k,$$

where for all k, T is some fixed time interval as a window time and $M_k$ is the number of windowed samples for the kth channel. The data from an entire network or a subset of the entire network at any moment in time may include many such channels.

An assessment or interference is a mapping from a set of M channel time series with a total dimension of D, to a set of N assessment parameters $Y=Y_1, Y_2 \ldots Y_N$. The mapping F may be explicitly or implicitly defined and the magnetic field sensor assessment constructs a workable mapping that is the solution to a particular assessment problem. Other meta-problems may include determining the mapping that is in some respect best, as well as determining the minimal and/or best physical arrangement of the magnetic field sensor nodes, if that is an option, for a given application.

When viewed from the perspective of a large and distributed SAN 570, such as multiple times larger than the security portal 530 of FIG. 23, there may be a hierarchy of assessments. For example, each node as a magnetic field sensor 550*a-d* may make an assessment locally based on sensor data obtained only from that node, and these nodal assessment parameters could be passed to central computational nodes, such as the illustrated SAN controller 544 in FIG. 23. Data may be assessed jointly. Alternatively, the assessment may be used to decide when to send the raw magnetic sensor data to a central computational node whether at the SAN controller 544 or other location and the raw data from many such nodes may be jointly assessed. The division of a particular application up into a hierarchy of assessments will depend on the application, and generally there may be trade-offs, such as speed versus assessment accuracy. There also may be constraints involved that force a hierarchy of assessments, such as the case where the method may run silent with no inter-nodal communication allowed until a critical moment.

An object with undetermined physical properties may move along an undetermined trajectory and may be sensed by measurements that are made at N known points in space and M moments in time, for example, the magnetic dipole moment in an unknown rectilinear trajectory. An object with an unknown but fixed magnetic dipole moment m, e.g., a portable IED or weapon, vehicle, etc., may move along an unknown rectilinear trajectory: $r(t)=vt+r_0$ over some time interval. Sensor measurements of the magnetic field vector $B_{ij}$ may be made at N known points in space.

A good measure of the error between the model and the data is given by the summed squared difference and the calculation processing may determine the magnetic field of a dipole moving on a constant-velocity trajectory. The dimensionless components of a magnetic field may be obtained and an object with a fixed dipole may be assumed to move on a rectilinear trajectory.

The partial derivatives of functions with respect to the unknown parameters may be determined:

$$\partial_{M_j} r_i = 0, \partial_{M_j} r = 0, \partial_{M_j} \alpha = r_j$$

$$\partial_{X_j} r_i = -\delta_{ij}, \partial_{X_j} r = -r_j/r, \partial_{X_j} \alpha = -M_j$$

$$\partial_{V_j} r_i = -\delta_{ij} t, \partial_{V_j} r = -r_j t/r, \partial_{V_j} \alpha = -M_j t$$

The partial derivatives with respect to the unknown parameters are:

$$D_{M,ij} = \partial_{M_j} b_i(t; P | \overline{Y}) = \frac{3}{r^3}\left[\frac{3 r_i r_j}{r^2} - \frac{\delta_{ij}}{3}\right],$$

$$\tilde{D}_M = \frac{3r \otimes r}{r^5} - \frac{\tilde{1}}{r^3}$$

The assessment functions may be used to perform an assessment analysis of magnetic sensor net data. For a single magnetic field sensor, there may be three equations for the x, y, z components of the dimensionless magnetic field. The set:

$$P = (M_x, M_y, M_z, X_x, X_y, X_z, V_x, V_y, V_z)$$

are the assessment parameters. The components of the dipole moment and the parameters determine its trajectory. To the set of functions:

$$[b_x, b_y, b_z],$$

the set of partial derivatives with respect to the nine parameters are added.

In an example, the parameter assessment for the x, y and z components of the magnetic field are viewed as a concatenation of the three waveforms into a single waveform. Likewise, the partial derivatives are a concatenation, and in effect, a single concatenized "b" function and nine concatenized partial derivative functions, one for each of respective nine assessment parameters that may be determined. These may be written in explicit form:

$$\left[\frac{3r_x \alpha}{r^5} - \frac{M_x}{r^3}, \frac{3r_y \alpha}{r^5} - \frac{M_y}{r^3}, \frac{3r_z \alpha}{r^5} - \frac{M_z}{r^3}\right]$$

Recognizing and exploiting the symmetries, the functions may be defined:

$$A = \frac{3r_x^2}{r^5} - \frac{1}{r^3}, B = \frac{3r_y^2}{r^5} - \frac{1}{r^3}, C = \frac{3r_z^2}{r^5} - \frac{1}{r^3}$$

In many cases, the raw magnetic data will contain offsets due to background field drift. These require three additional parameters that need to be chosen:

$$[b_x + o_x, b_y + o_y, b_z + o_z].$$

Figure 24:
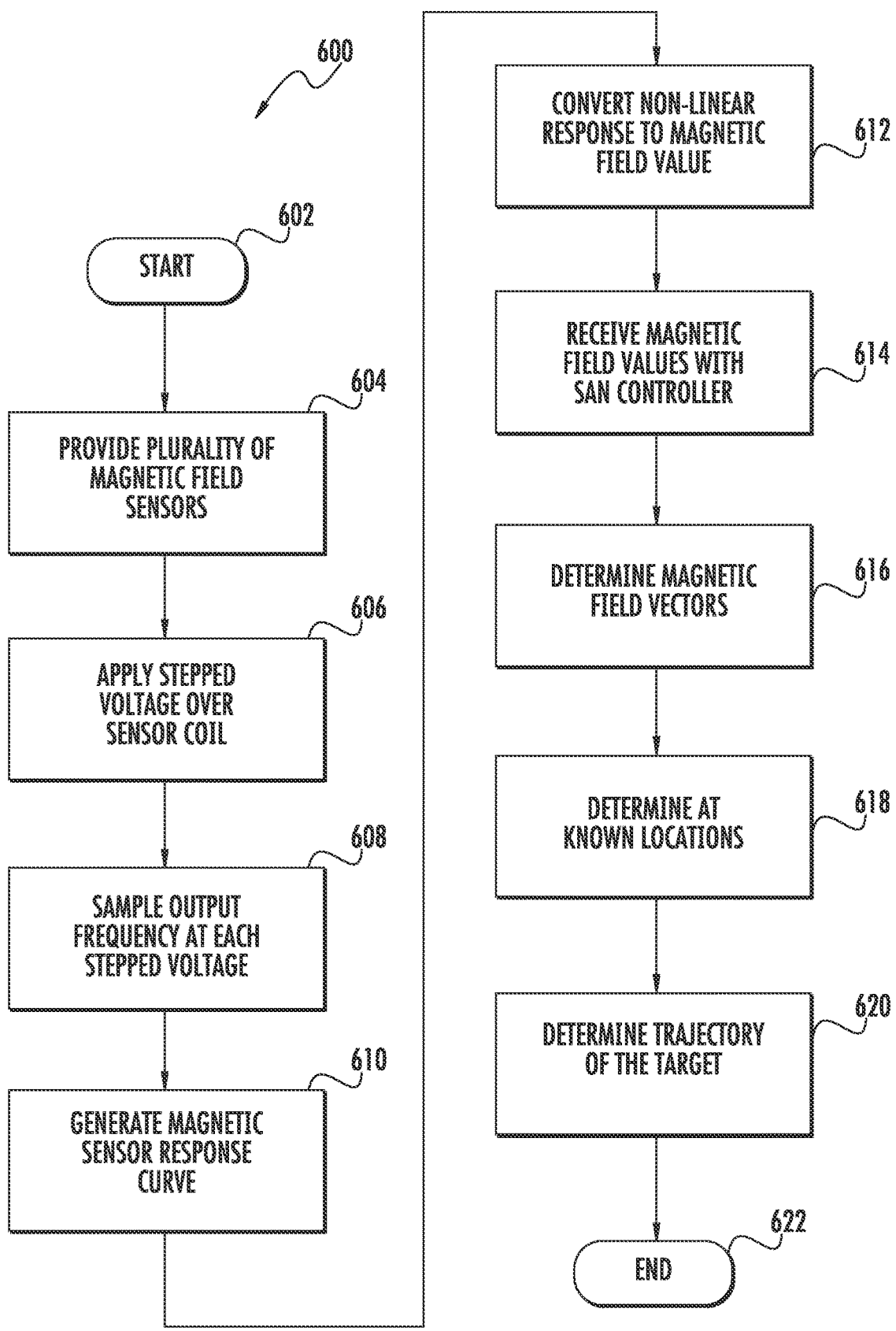
FIG. 24 is a high level flowchart illustrating a method of operating the SAN of FIG. 23.

Referring now to FIG. 24, there is illustrated at 600 a high-level flowchart illustrating a method of operating the SAN 570 as shown in FIG. 23. The process starts (Block 602) and a plurality of magnetic field sensors are provided (Block 604) such as in the SAN 570. The method includes applying a stepped voltage (Block 606) and sampling an output frequency at each stepped voltage value (Block 608). The method includes generating a magnetic sensor response curve (Block 610) and converting a non-linear response of the sensor transducer to a magnetic field value (Block 612). The method continues by receiving the magnetic field values within the SAN controller 544 (Block 614) and determining the magnetic field vectors of the target over each sample (Block 616).

The method further includes determining the magnetic field vectors of the target at known locations (Block 618) and determining the trajectory of the target, for example, based upon signal attenuation of a magnetic dipole for the target and a dot-product of matrices of partial derivatives (Block 620). The process ends (Block 622).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A security portal having an environment to be monitored and through which individuals entering or exiting the security portal pass, comprising:
 a plurality of magnetic field sensors spaced from each other within the environment to be monitored and defining a sensor assessment network (SAN) for tracking a target having a magnetic dipole within the environment to be monitored, each magnetic field sensor having x, y and z axes and producing x, y and z channels at respective axes, and each comprising,
a sensor transducer having a sensor coil,
a digitally controlled potentiometer connected to the sensor coil,
a sensor controller connected to the sensor coil and digitally controlled potentiometer and configured to
apply a stepped voltage from negative to positive over the sensor coil,
sample an output frequency at each stepped voltage value,
generate a magnetic sensor response curve, and
convert a non-linear response of the sensor transducer to a magnetic field value for each channel as a function of frequency for a specific potentiometer setting based upon a sensed magnetic dipole as a target that is tracked in the security portal; and
a SAN controller connected to each magnetic field sensor and configured to receive the magnetic field values of each channel in each magnetic field sensor and determine the magnetic field vectors of the target over each sample.

2. The security portal of claim 1 wherein the SAN controller is integrated into one of said plurality of magnetic field sensors.

3. The security portal of claim 1 wherein each sensor controller is configured to sample at about 100 ms intervals in timed relation to other respective sensor controllers.

4. The security portal of claim 1 wherein the SAN controller is configured to determine the magnetic field vectors of the target at known locations.

5. The security portal of claim 4 wherein the SAN controller is configured to determine the trajectory of the target based upon signal attenuation of the magnetic dipole and a dot-product of matrices of partial derivatives.

6. The security portal of claim 1 comprising a camera connected to the SAN controller and positioned to image the security portal, wherein said SAN controller is configured to generate an overlay of the target position to an image of the security portal produced by the camera.

7. The security portal of claim 1 wherein each sensor coil comprises a primary coil and a secondary, over-winding coil.

8. The security portal of claim 1 further comprising four magnetic field sensors positioned in a rectilinear configuration.

9. The security portal of claim 1 comprising a portal structure, wherein the magnetic field sensors are positioned on the portal structure.

10. The security portal according to claim 1 wherein each sensor controller is configured to set the gain of the digitally controlled potentiometer at a maximum value for each x, y and z channel independently.

11. A sensor assessment network (SAN), comprising:
a plurality of magnetic field sensors, each magnetic field sensor having x, y and z axes and producing x, y and z channels at respective axes and each comprising,
a sensor transducer having a sensor coil,
a digitally controlled potentiometer connected to the sensor coil,
a sensor controller connected to the sensor coil and digitally controlled potentiometer and configured to
apply a stepped voltage from negative to positive over the sensor coil,
sample an output frequency at each stepped voltage value,
generate a magnetic sensor response curve, and
convert a non-linear response of the sensor transducer to a magnetic field value for each channel as a function of frequency for a specific potentiometer setting based upon a sensed magnetic dipole of a target; and
a SAN controller connected to each magnetic field sensor and configured to receive the magnetic field values of each channel in each magnetic field sensor and determine the magnetic field vectors of the target over each sample.

12. The SAN of claim 11 wherein the SAN controller is integrated into one of said plurality of magnetic field sensors.

13. The SAN of claim 11 wherein each sensor controller is configured to sample at about 100 ms intervals in timed relation to other respective sensor controllers.

14. The SAN of claim 11 wherein the SAN controller is configured to determine the magnetic field vectors of the target at known locations.

15. The SAN of claim 14 wherein the SAN controller is configured to determine the trajectory of the target based upon signal attenuation of a magnetic dipole for the target and a dot-product of matrices of partial derivatives.

16. The SAN of claim 11 wherein said sensor coil comprises a primary coil and secondary, over-winding coil.

17. The SAN of claim 11 further comprising four magnetic field sensors positioned in a rectilinear configuration.

18. The SAN of claim 11 wherein each sensor controller is configured to set the gain of the digitally controlled potentiometer at a maximum value for each x, y and z channel independently.

19. A method of operating a sensor assessment network (SAN), comprising:
providing a plurality of magnetic field sensors, each magnetic field sensor having x, y and z axes and producing x, y and z channels at respective axes and each comprising, a sensor transducer having a sensor coil, a digitally controlled potentiometer connected to the sensor coil, and a sensor controller connected to the sensor coil and digitally controlled potentiometer;
applying a stepped voltage from negative to positive over the sensor coil;
sampling an output frequency at each stepped voltage value;
generating a magnetic sensor response curve and converting a non-linear response of the sensor transducer to a magnetic field value for each channel as a function of frequency for a specific potentiometer setting based upon a sensed magnetic dipole;
receiving the magnetic field values within a SAN controller connected to each magnetic field sensor; and
determining the magnetic field vectors of the target over each sample based upon the magnetic field value.

20. The method of claim 19 wherein the SAN controller is integrated into one of the plurality of magnetic field sensors.

21. The method of claim 19 wherein the controller is configured to sample at about 100 ms intervals in timed relation to other respective sensor controllers.

22. The method of claim 19 wherein the controller is configured to determine the magnetic field vectors of the target at known locations.

23. The method of claim 22 wherein the SAN controller is configured to determine the trajectory of the target based upon signal attenuation of a magnetic dipole for the target and a dot-product of matrices of partial derivatives.

24. The method of claim 19 wherein said sensor coil comprises a primary coil and secondary, over-winding coil.

25. The method of claim 19 comprising arranging four magnetic field sensors in a rectilinear configuration.

26. The method of claim 19 comprising setting the gain of the digitally controlled potentiometer at a maximum value for each x, y and z channel independently.

* * * * *